United States Patent
Shu et al.

(10) Patent No.: US 10,154,450 B2
(45) Date of Patent: Dec. 11, 2018

(54) CELL SELECTION METHOD AND APPARATUS

(71) Applicant: Huawei Technologies Co., Ltd., Shenzhen (CN)

(72) Inventors: Lin Shu, Shanghai (CN); Xibo Sun, Shanghai (CN); Yi Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/807,232

(22) Filed: Nov. 8, 2017

(65) Prior Publication Data
US 2018/0070297 A1   Mar. 8, 2018

Related U.S. Application Data

(63) Continuation of application No. PCT/CN2015/079372, filed on May 20, 2015.

(51) Int. Cl.
 *H04W 4/00* (2018.01)
 *H04W 48/16* (2009.01)
 (Continued)

(52) U.S. Cl.
 CPC .......... *H04W 48/16* (2013.01); *H04W 48/18* (2013.01); *H04W 88/06* (2013.01)

(58) Field of Classification Search
 CPC ... H04W 36/00–36/385; H04W 48/06; H04W 48/00; H04W 48/16; H04W 48/18
 (Continued)

(56) References Cited

U.S. PATENT DOCUMENTS

2010/0216465 A1   8/2010   Mubarek et al.
2013/0286950 A1   10/2013   Pu
(Continued)

FOREIGN PATENT DOCUMENTS

CN   101877904 A   11/2010
CN   101990184 A   3/2011
(Continued)

OTHER PUBLICATIONS

"SMS Service via PS domain," 3GPP TSG-CT WG1 Meeting #77, Taipei, Taiwan, XP050587303, C1-121212, 3rd Generation Partnership Project, Valbonne, France (Apr. 16-20, 2012).
(Continued)

*Primary Examiner* — Ronald Eisner
(74) *Attorney, Agent, or Firm* — Leydig, Voit & Mayer, Ltd.

(57) ABSTRACT

The present invention provides a cell selection method and apparatus. The cell selection method includes: sending, by a non-access stratum of user equipment UE, network list information to an access stratum of the UE, where the network list information includes a list of forbidden networks and a list of forbidden networks for a GPRS service; determining, by the non-access stratum, indication information about a cell selection priority according to an operation mode of the UE; and sending, by the non-access stratum, the indication information to the access stratum, so that the access stratum selects a suitable cell according to the network list information and the indication information. The present invention can effectively prevent the UE from entering a state of being able to normally camp but unable to obtain a normal service, thereby improving user experience.

18 Claims, 9 Drawing Sheets

(51) Int. Cl.
*H04W 48/18* (2009.01)
*H04W 88/06* (2009.01)

(58) Field of Classification Search
USPC ....... 455/432.1–434, 436–444; 370/321–334
See application file for complete search history.

(56) References Cited

U.S. PATENT DOCUMENTS

2014/0235242 A1* 8/2014 Granzow .............. H04W 48/17
455/436
2016/0006726 A1* 1/2016 Mizikovsky .......... H04L 63/061
713/171

FOREIGN PATENT DOCUMENTS

| CN | 102025627 A | 4/2011 |
|---|---|---|
| EP | 2555547 A1 | 2/2013 |
| EP | 2806694 A1 | 11/2014 |
| WO | 2011020002 A1 | 2/2011 |
| WO | 2012135994 A1 | 10/2012 |

OTHER PUBLICATIONS

"3rd Generation Partnership Project; Technical Specification Group Radio Access Network; User Equipment (UE) procedures in idle mode and procedures for cell reselection in connected mode (Release 12)," 3GPP TS 25.304, V12.5.0, pp. 1-58, 3rd Generation Partnership Project, Valbonne, France (Mar. 2015).

"3rd Generation Partnership Project; Technical Specification Group Radio Access Network; Evolved Universal Terrestrial Radio Access (E-UTRA); User Equipment (UE) procedures in idle mode (Release 12)," 3GPP TS 36.304, V12.4.0, pp. 1-38, 3rd Generation Partnership Project, Valbonne, France (Mar. 2015).

* cited by examiner

CELL SELECTION METHOD AND APPARATUS

CROSS-REFERENCE TO RELATED APPLICATIONS

This application is a continuation of International Application No. PCT/CN2015/079372, filed on May 20, 2015, the disclosure of which is hereby incorporated by reference in its entirety.

TECHNICAL FIELD

The present invention relates to the communications field, and in particular, to a cell selection method and apparatus.

BACKGROUND

The 3rd Generation Partnership Project (3GPP) defines list information that a user equipment (UE) needs to maintain at a non-access stratum (NAS), such as an equivalent public land mobile network (EPLMN) list, a list of forbidden location areas, a list of forbidden public land mobile networks (PLMNs), and a list of forbidden PLMNs for a GPRS (General Packet Radio Service).

A network side delivers an EPLMN list in an attach accept message or a location update accept message to UE, and the UE stores the EPLMN list. For all radio access technologies (RAT), the UE stores, at any time, only a latest EPLMN list received from the network side. If the network side rejects a registration request of the UE because a location area in which the UE is located is not allowed, the UE adds the current location area in which the UE is located, to a corresponding list of forbidden location areas. If the network side rejects a registration request of the UE because a network is not allowed (PLMN not allowed), the UE adds an identity of the current network to a list of forbidden PLMNs. If the network side rejects a registration request of the UE because GPRS services are not allowed in this network (GPRS services not allowed in this PLMN) or EPS (evolved packet system) services are not allowed in this network (EPS services not allowed in this PLMN), the UE adds an identity of the current network to a list of forbidden networks for a GPRS service (Forbidden PLMNs for GPRS service).

The 3GPP also defines a method for selecting a suitable cell by the UE. The suitable cell is a cell in a PLMN currently selected by the UE, or is a cell in a PLMN with which the UE currently registers, or is a cell in an equivalent PLMN of the UE. In addition, a location area of the suitable cell is not in the list of forbidden location areas. The 3GPP further defines that the NAS does not need to perform a PLMN selection procedure for an inter-EPLMN cell reselection, and that an AS (access stratum) may implement seamless moving between EPLMNs by performing a cell reselection.

In the process of selecting the suitable cell, the NAS of the UE provides the maintained EPLMN list and the maintained list of forbidden location areas to the AS of the UE. In addition, in the process of selecting the suitable cell, the NAS provides information about a currently used RAT to the AS. Different operation modes may be configured for the NAS of the UE: supporting only CS (circuit switched) service, supporting only PS (packet switched) service, or supporting CS service and PS service. For UE supporting CS service and PS service, whether CS service is preferred or PS service is preferred may be further configured.

The UE can camp on a suitable cell in an EPLMN by performing a suitable cell reselection at a lower layer, without initiating a network selection procedure. When this EPLMN is also included in the list of forbidden networks or the list of forbidden networks for the GPRS service, the UE enters a limited service state, that is, the UE can normally camp, but cannot obtain a normal service, and therefore, user experience is affected.

SUMMARY

The present invention provides a cell selection method and apparatus to effectively prevent UE from entering a state of being able to normally camp but unable to obtain a normal service, thereby improving user experience.

According to a first aspect, the present invention provides a cell selection method, including:

sending, by a non-access stratum of a user equipment UE, network list information to an access stratum of the UE, where the network list information includes a list of forbidden networks and a list of forbidden networks for a GPRS service;

determining, by the non-access stratum, indication information about a cell selection priority according to an operation mode of the UE; and sending, by the non-access stratum, the indication information to the access stratum, so that the access stratum selects a suitable cell according to the network list information and the indication information.

With reference to the first aspect of the present invention, in a first implementation of the first aspect of the present invention, the determining, by the non-access stratum, indication information about a cell selection priority according to an operation mode of the UE includes at least one of the following five cases:

a first case: the non-access stratum determines, according to the operation mode of the UE, that the indication information is: selecting only a cell in which a circuit switched service is available, where the operation mode of the UE is: supporting only the circuit switched service;

a second case: the non-access stratum determines, according to the operation mode of the UE, that the indication information is: selecting only a cell in which a packet switched service is available, where the operation mode of the UE is: supporting only the packet switched service;

a third case: the non-access stratum determines, according to the operation mode of the UE, that the indication information is: selecting a cell in which both a circuit switched service and a packet switched service are available, where the operation mode of the UE is: supporting the circuit switched service and the packet switched service;

a fourth case: the non-access stratum determines, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth case: the non-access stratum determines, according to the operation mode of the UE, that the indication information is: selecting a cell in which both a circuit switched service and a packet switched service are available, where the operation mode of the UE is: supporting the circuit switched service and the packet switched service with the packet switched service preferred.

With reference to the first aspect of the present invention, in a second implementation of the first aspect of the present invention, the network list information further includes a list of forbidden networks for a non-GPRS service, and the determining, by the non-access stratum, indication information about a cell selection priority according to an operation mode of the UE includes at least one of the following five cases:

a first case: the non-access stratum determines, according to the operation mode of the UE, that the indication information is: selecting only a cell in which a circuit switched service is available, where the operation mode of the UE is: supporting only the circuit switched service;

a second case: the non-access stratum determines, according to the operation mode of the UE, that the indication information is: selecting only a cell in which a packet switched service is available, where the operation mode of the UE is: supporting only the packet switched service;

a third case: the non-access stratum determines, according to the operation mode of the UE, that the indication information is: selecting a cell in which both a circuit switched service and a packet switched service are available, where the operation mode of the UE is: supporting the circuit switched service and the packet switched service;

a fourth case: the non-access stratum determines, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth case: the non-access stratum determines, according to the operation mode of the UE, that the indication information is: preferentially selecting a cell in which both a circuit switched service and a packet switched service are available, and if there is no such cell, selecting a cell in which the packet switched service is available, where the operation mode of the UE is: supporting the circuit switched service and the packet switched service with the packet switched service preferred.

With reference to the second implementation of the first aspect of the present invention, in a third implementation of the first aspect of the present invention, before the sending, by a non-access stratum of a user equipment UE, network list information to an access stratum of the UE, the method includes:

adding, by the non-access stratum of the user equipment UE, to the list of forbidden networks for the non-GPRS service, a network in which the non-GPRS service is unavailable, where the network in which the non-GPRS service is unavailable is a network that rejects a non-GPRS service registration request sent by the UE.

According to a second aspect, the present invention provides a cell selection method, including:

receiving, by an access stratum of a user equipment UE, network list information sent by a non-access stratum of the UE, where the network list information includes a list of forbidden networks and a list of forbidden networks for a GPRS service;

receiving, by the access stratum, indication information that is about a cell selection priority and is sent by the non-access stratum, where the indication information is determined by the non-access stratum according to an operation mode of the UE; and selecting, by the access stratum, a suitable cell according to the network list information and the indication information.

With reference to the second aspect of the present invention, in a first implementation of the second aspect of the present invention, the selecting, by the access stratum, a suitable cell according to the network list information and the indication information includes at least one of the following four cases:

a first case: the access stratum selects a first cell according to the network list information and the indication information, where a network to which the first cell belongs is not in the list of forbidden networks, and the indication information is: selecting only a cell in which a circuit switched service is available;

a second case: the access stratum selects a second cell according to the network list information and the indication information, where a network to which the second cell belongs is not in the list of forbidden networks and the list of forbidden networks for the GPRS service, and the indication information is: selecting only a cell in which a packet switched service is available;

a third case: the access stratum selects a third cell according to the network list information and the indication information, where a network to which the third cell belongs is not in the list of forbidden networks and the list of forbidden networks for the GPRS service, and the indication information is: selecting a cell in which both a circuit switched service and a packet switched service are available; or a fourth case: the access stratum preferentially selects a fourth cell according to the network list information and the indication information, and if there is no such cell, selects a fifth cell, where a network to which the fourth cell belongs is not in the list of forbidden networks and the list of forbidden networks for the GPRS service, a network to which the fifth cell belongs is not in the list of forbidden networks, and the indication information is: preferentially selecting a cell in which both a circuit switched service and a packet switched service are available, and if there is no such cell, selecting a cell in which the circuit switched service is available.

With reference to the second aspect of the present invention, in a second implementation of the second aspect of the present invention, the network list information further includes a list of forbidden networks for a non-GPRS service, and the selecting, by the access stratum, a suitable cell according to the network list information and the indication information includes at least one of the following five cases:

a first case: the access stratum selects a first cell according to the network list information and the indication information, where a network to which the first cell belongs is not in the list of forbidden networks and the list of forbidden networks for the non-GPRS service, and the indication information is: selecting only a cell in which a circuit switched service is available;

a second case: the access stratum selects a second cell according to the network list information and the indication information, where a network to which the second cell belongs is not in the list of forbidden networks and the list of forbidden networks for the GPRS service, and the indication information is: selecting only a cell in which a packet switched service is available;

a third case: the access stratum selects a third cell according to the network list information and the indication information, where a network to which the third cell belongs is not in the list of forbidden networks, the list of forbidden networks for the GPRS service, and the list of forbidden networks for the non-GPRS service, and the indication information is: selecting a cell in which both a circuit switched service and a packet switched service are available;

a fourth case: the access stratum preferentially selects a fourth cell according to the network list information and the indication information, and if there is no such cell, selects a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the indication information is: preferentially selecting a cell in which both a circuit switched service and a packet switched service are available, and if there is no such cell, selecting a cell in which the circuit switched service is available; or a fifth case: the access stratum preferentially selects a sixth cell according to the network list information and the indication information, and if there is no such cell, selects a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the indication information is: preferentially selecting a cell in which both a circuit switched service and a packet switched service are available, and if there is no such cell, selecting a cell in which the packet switched service is available.

According to a third aspect, the present invention provides a cell selection method, including:

sending, by a non-access stratum of a user equipment UE, network list information to an access stratum of the UE, where the network list information includes a list of forbidden networks and a list of forbidden networks for a GPRS service; and sending, by the non-access stratum, operation mode information of the UE to the access stratum, so that the access stratum selects a suitable cell according to the network list information and the operation mode information.

With reference to the third aspect of the present invention, in a first implementation of the third aspect of the present invention, the operation mode information of the UE includes at least one of the following five cases:

a first case: supporting only a circuit switched service;

a second case: supporting only a packet switched service;

a third case: supporting a circuit switched service and a packet switched service;

a fourth case: supporting a circuit switched service and a packet switched service with the circuit switched service preferred; or a fifth case: supporting a circuit switched service and a packet switched service with the packet switched service preferred.

With reference to the third aspect of the present invention or the first implementation of the third aspect, in a second implementation of the third aspect of the present invention, the network list information further includes a list of forbidden networks for a non-GPRS service.

With reference to the second implementation of the third aspect of the present invention, in a third implementation of the third aspect of the present invention, before the sending, by a non-access stratum of a user equipment UE, network list information to an access stratum of the UE, the method includes:

adding, by the non-access stratum of the user equipment UE, to the list of forbidden networks for the non-GPRS service, a network in which the non-GPRS service is unavailable, where the network in which the non-GPRS service is unavailable is a network that rejects a non-GPRS service registration request sent by the UE.

According to a fourth aspect, the present invention provides a cell selection method, including:

receiving, by an access stratum of a user equipment UE, network list information sent by a non-access stratum of the UE, where the network list information includes a list of forbidden networks and a list of forbidden networks for a GPRS service;

receiving, by the access stratum, operation mode information of the UE that is sent by the non-access stratum; and selecting, by the access stratum, a suitable cell according to the network list information and the operation mode information.

With reference to the fourth aspect of the present invention, in a first implementation of the fourth aspect of the present invention, the selecting, by the access stratum, a suitable cell according to the network list information and the operation mode information includes at least one of the following five cases:

a first case: the access stratum selects a first cell according to the network list information and the operation mode information, where a network to which the first cell belongs is not in the list of forbidden networks, and the operation mode information is: supporting only a circuit switched service;

a second case: the access stratum selects a second cell according to the network list information and the operation mode information, where a network to which the second cell belongs is not in the list of forbidden networks and the list of forbidden networks for the GPRS service, and the operation mode information is: supporting only a packet switched service;

a third case: the access stratum selects a third cell according to the network list information and the operation mode information, where a network to which the third cell belongs is not in the list of forbidden networks and the list of forbidden networks for the GPRS service, and the operation mode information is: supporting a circuit switched service and a packet switched service;

a fourth case: the access stratum preferentially selects a fourth cell according to the network list information and the operation mode information, and if there is no such cell, selects a fifth cell, where a network to which the fourth cell belongs is not in the list of forbidden networks and the list of forbidden networks for the GPRS service, a network to which the fifth cell belongs is not in the list of forbidden networks, and the operation mode information is: supporting a circuit switched service and a packet switched service with the circuit switched service preferred; or a fifth case: the access stratum selects a sixth cell according to the network list information and the operation mode information, where a network to which the sixth cell belongs is not in the list of forbidden networks and the list of forbidden networks for the GPRS service, and the operation mode information is: supporting a circuit switched service and a packet switched service with the packet switched service preferred.

With reference to the fourth aspect of the present invention, in a second implementation of the fourth aspect of the present invention, the network list information further includes a list of forbidden networks for a non-GPRS service, and the selecting, by the access stratum, a suitable cell according to the network list information and the operation mode information includes at least one of the following five cases:

a first case: the access stratum selects a first cell according to the network list information and the operation mode information, where a network to which the first cell belongs is not in the list of forbidden networks and the list of forbidden networks for the non-GPRS service, and the operation mode information is: supporting only a circuit switched service;

a second case: the access stratum selects a second cell according to the network list information and the operation mode information, where a network to which the second cell belongs is not in the list of forbidden networks and the list of forbidden networks for the GPRS service, and the operation mode information is: supporting only a packet switched service;

a third case: the access stratum selects a third cell according to the network list information and the operation mode information, where a network to which the third cell belongs is not in the list of forbidden networks, the list of forbidden networks for the GPRS service, and the list of forbidden networks for the non-GPRS service, and the operation mode information is: supporting a circuit switched service and a packet switched service;

a fourth case: the access stratum preferentially selects a fourth cell according to the network list information and the operation mode information, and if there is no such cell, selects a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the operation mode information is: supporting a circuit switched service and a packet switched service with the circuit switched service preferred; or a fifth case: the access stratum preferentially selects a sixth cell according to the network list information and the operation mode information, and if there is no such cell, selects a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the operation mode information is: supporting a circuit switched service and a packet switched service with the packet switched service preferred.

According to a fifth aspect, the present invention provides a cell selection apparatus, including:

a first sending unit, configured to send network list information to an access stratum of a user equipment UE, where the network list information includes a list of forbidden networks and a list of forbidden networks for a GPRS service;

a determining unit, configured to determine indication information about a cell selection priority according to an operation mode of the UE; and a second sending unit, configured to send the indication information to the access stratum, so that the access stratum selects a suitable cell according to the network list information and the indication information.

With reference to the fifth aspect of the present invention, in a first implementation of the fifth aspect of the present invention, the determining unit includes at least one of the following subunits:

a first determining subunit, configured to determine, according to the operation mode of the UE, that the indication information is: selecting only a cell in which a circuit switched service is available, where the operation mode of the UE is: supporting only the circuit switched service;

a second determining subunit, configured to determine, according to the operation mode of the UE, that the indication information is: selecting only a cell in which a packet switched service is available, where the operation mode of the UE is: supporting only the packet switched service;

a third determining subunit, configured to determine, according to the operation mode of the UE, that the indication information is: selecting a cell in which both a circuit switched service and a packet switched service are available, where the operation mode of the UE is: supporting the circuit switched service and the packet switched service;

a fourth determining subunit, configured to determine, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth determining subunit, configured to determine, according to the operation mode of the UE, that the indication information is: selecting a cell in which both a circuit switched service and a packet switched service are available, where the operation mode of the UE is: supporting the circuit switched service and the packet switched service with the packet switched service preferred.

With reference to the fifth aspect of the present invention, in a second implementation of the fifth aspect of the present invention, the network list information further includes a list of forbidden networks for a non-GPRS service, and the determining unit includes at least one of the following subunits:

a first determining subunit, configured to determine, according to the operation mode of the UE, that the indication information is: selecting only a cell in which a circuit switched service is available, where the operation mode of the UE is: supporting only the circuit switched service;

a second determining subunit, configured to determine, according to the operation mode of the UE, that the indication information is: selecting only a cell in which a packet switched service is available, where the operation mode of the UE is: supporting only the packet switched service;

a third determining subunit, configured to determine, according to the operation mode of the UE, that the indication information is: selecting a cell in which both a circuit switched service and a packet switched service are available, where the operation mode of the UE is: supporting the circuit switched service and the packet switched service;

a fourth determining subunit, configured to determine, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth determining subunit, configured to determine, according to the operation mode of the UE, that the indication information is: preferentially selecting a cell in which both a circuit switched service and a packet switched service are available, and if there is no such cell, selecting a cell in which the packet switched service is available, where the operation mode of the UE is: supporting the circuit switched service and the packet switched service with the packet switched service preferred.

With reference to the second implementation of the fifth aspect of the present invention, in a third implementation of the fifth aspect of the present invention, the apparatus further includes:

a management unit, configured to add, to the list of forbidden networks for the non-GPRS service, a network in which the non-GPRS service is unavailable, where the network in which the non-GPRS service is unavailable is a network that rejects a non-GPRS service registration request sent by the UE.

According to a sixth aspect, the present invention provides a cell selection apparatus, including:

a first receiving unit, configured to receive network list information sent by a non-access stratum of a user equipment UE, where the network list information includes a list of forbidden networks and a list of forbidden networks for a GPRS service;

a second receiving unit, configured to receive indication information that is about a cell selection priority and is sent by the non-access stratum, where the indication information is determined by the non-access stratum according to an operation mode of the UE; and a selection unit, configured to select a suitable cell according to the network list information and the indication information.

With reference to the sixth aspect of the present invention, in a first implementation of the sixth aspect of the present invention, the selection unit includes at least one of the following subunits:

a first selection subunit, configured to select a first cell according to the network list information and the indication information, where a network to which the first cell belongs is not in the list of forbidden networks, and the indication information is: selecting only a cell in which a circuit switched service is available;

a second selection subunit, configured to select a second cell according to the network list information and the indication information, where a network to which the second cell belongs is not in the list of forbidden networks and the list of forbidden networks for the GPRS service, and the indication information is: selecting only a cell in which a packet switched service is available;

a third selection subunit, configured to select a third cell according to the network list information and the indication information, where a network to which the third cell belongs is not in the list of forbidden networks and the list of forbidden networks for the GPRS service, and the indication information is: selecting a cell in which both a circuit switched service and a packet switched service are available; or a fourth selection subunit, configured to preferentially select a fourth cell according to the network list information and the indication information, and if there is no such cell, select a fifth cell, where a network to which the fourth cell belongs is not in the list of forbidden networks and the list of forbidden networks for the GPRS service, a network to which the fifth cell belongs is not in the list of forbidden networks, and the indication information is: preferentially selecting a cell in which both a circuit switched service and a packet switched service are available, and if there is no such cell, selecting a cell in which the circuit switched service is available.

With reference to the sixth aspect of the present invention, in a second implementation of the sixth aspect of the present invention, the network list information further includes a list of forbidden networks for a non-GPRS service, and the selection unit includes at least one of the following subunits:

a first selection subunit, configured to select a first cell according to the network list information and the indication information, where a network to which the first cell belongs is not in the list of forbidden networks and the list of forbidden networks for the non-GPRS service, and the indication information is: selecting only a cell in which a circuit switched service is available;

a second selection subunit, configured to select a second cell according to the network list information and the indication information, where a network to which the second cell belongs is not in the list of forbidden networks and the list of forbidden networks for the GPRS service, and the indication information is: selecting only a cell in which a packet switched service is available;

a third selection subunit, configured to select a third cell according to the network list information and the indication information, where a network to which the third cell belongs is not in the list of forbidden networks, the list of forbidden networks for the GPRS service, and the list of forbidden networks for the non-GPRS service, and the indication information is: selecting a cell in which both a circuit switched service and a packet switched service are available;

a fourth selection subunit, configured to preferentially select a fourth cell according to the network list information and the indication information, and if there is no such cell, select a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the indication information is: preferentially selecting a cell in which both a circuit switched service and a packet switched service are available, and if there is no such cell, selecting a cell in which the circuit switched service is available; or a fifth selection subunit, configured to preferentially select a sixth cell according to the network list information and the indication information, and if there is no such cell, select a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the indication information is: preferentially selecting a cell in which both a circuit switched service and a packet switched service are available, and if there is no such cell, selecting a cell in which the packet switched service is available.

According to a seventh aspect, the present invention provides a cell selection apparatus, including:

a first sending module, configured to send network list information to an access stratum of a user equipment UE, where the network list information includes a list of forbidden networks and a list of forbidden networks for a GPRS service; and a second sending module, configured to send operation mode information of the UE to the access stratum, so that the access stratum selects a suitable cell according to the network list information and the operation mode information.

With reference to the seventh aspect of the present invention, in a first implementation of the seventh aspect of the present invention, the operation mode information of the UE includes at least one of the following five cases:

a first case: supporting only a circuit switched service;

a second case: supporting only a packet switched service;

a third case: supporting a circuit switched service and a packet switched service;

a fourth case: supporting a circuit switched service and a packet switched service with the circuit switched service preferred; or a fifth case: supporting a circuit switched service and a packet switched service with the packet switched service preferred.

With reference to the seventh aspect of the present invention or the first implementation of the seventh aspect, in a second implementation of the seventh aspect of the present invention, the network list information further includes a list of forbidden networks for a non-GPRS service.

With reference to the second implementation of the seventh aspect of the present invention, in a third implementation of the seventh aspect of the present invention, the apparatus further includes:

a management module, configured to add, to the list of forbidden networks for the non-GPRS service, a network in which the non-GPRS service is unavailable, where the network in which the non-GPRS service is unavailable is a network that rejects a non-GPRS service registration request sent by the UE.

According to an eighth aspect, the present invention provides a cell selection apparatus, including:

a first receiving module, configured to receive network list information sent by a non-access stratum of a user equipment UE, where the network list information includes a list of forbidden networks and a list of forbidden networks for a GPRS service;

a second receiving module, configured to receive operation mode information of the UE that is sent by the non-access stratum; and a selection module, configured to select a suitable cell according to the network list information and the operation mode information.

With reference to the eighth aspect of the present invention, in a first implementation of the eighth aspect of the present invention, the selection module includes at least one of the following submodules:

a first selection submodule, configured to select a first cell according to the network list information and the operation mode information, where a network to which the first cell belongs is not in the list of forbidden networks, and the operation mode information is: supporting only a circuit switched service;

a second selection submodule, configured to select a second cell according to the network list information and the operation mode information, where a network to which the second cell belongs is not in the list of forbidden networks and the list of forbidden networks for the GPRS service, and the operation mode information is: supporting only a packet switched service;

a third selection submodule, configured to select a third cell according to the network list information and the operation mode information, where a network to which the third cell belongs is not in the list of forbidden networks and the list of forbidden networks for the GPRS service, and the operation mode information is: supporting a circuit switched service and a packet switched service;

a fourth selection submodule, configured to preferentially select a fourth cell according to the network list information and the operation mode information, and if there is no such cell, select a fifth cell, where a network to which the fourth cell belongs is not in the list of forbidden networks and the list of forbidden networks for the GPRS service, a network to which the fifth cell belongs is not in the list of forbidden networks, and the operation mode information is: supporting a circuit switched service and a packet switched service with the circuit switched service preferred; or a fifth selection submodule, configured to preferentially select a sixth cell according to the network list information and the operation mode information, where a network to which the sixth cell belongs is not in the list of forbidden networks and the list of forbidden networks for the GPRS service, and the operation mode information is: supporting a circuit switched service and a packet switched service with the packet switched service preferred.

With reference to the eighth aspect of the present invention, in a second implementation of the eighth aspect of the present invention, the network list information further includes a list of forbidden networks for a non-GPRS service, and the selection module includes at least one of the following submodules:

a first selection submodule, configured to select a first cell according to the network list information and the operation mode information, where a network to which the first cell belongs is not in the list of forbidden networks and the list of forbidden networks for the non-GPRS service, and the operation mode information is: supporting only a circuit switched service;

a second selection submodule, configured to select a second cell according to the network list information and the operation mode information, where a network to which the second cell belongs is not in the list of forbidden networks and the list of forbidden networks for the GPRS service, and the operation mode information is: supporting only a packet switched service;

a third selection submodule, configured to select a third cell according to the network list information and the operation mode information, where a network to which the third cell belongs is not in the list of forbidden networks, the list of forbidden networks for the GPRS service, and the list of forbidden networks for the non-GPRS service, and the operation mode information is: supporting a circuit switched service and a packet switched service;

a fourth selection submodule, configured to preferentially select a fourth cell according to the network list information and the operation mode information, and if there is no such cell, select a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the operation mode information is: supporting a circuit switched service and a packet switched service with the circuit switched service preferred; or a fifth selection submodule, configured to preferentially select a sixth cell according to the network list information and the operation mode information, and if there is no such cell, select a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the operation mode information is: supporting a circuit switched service and a packet switched service with the packet switched service preferred.

As can be seen from the foregoing technical solutions, the embodiments of the present invention have the following advantages: The non-access stratum of the user equipment UE sends the network list information to the access stratum of the UE, where the network list information includes the list of forbidden networks and the list of forbidden networks for a GPRS service; the non-access stratum determines the indication information about the cell selection priority according to the operation mode of the UE; and the non-access stratum sends the indication information to the access stratum, so that the access stratum selects a suitable cell according to the network list information and the indication information. Therefore, the UE is prevented from entering a state of being able to normally camp but unable to obtain a normal service, and user experience is improved.

DESCRIPTION OF EMBODIMENTS

Figure 1:
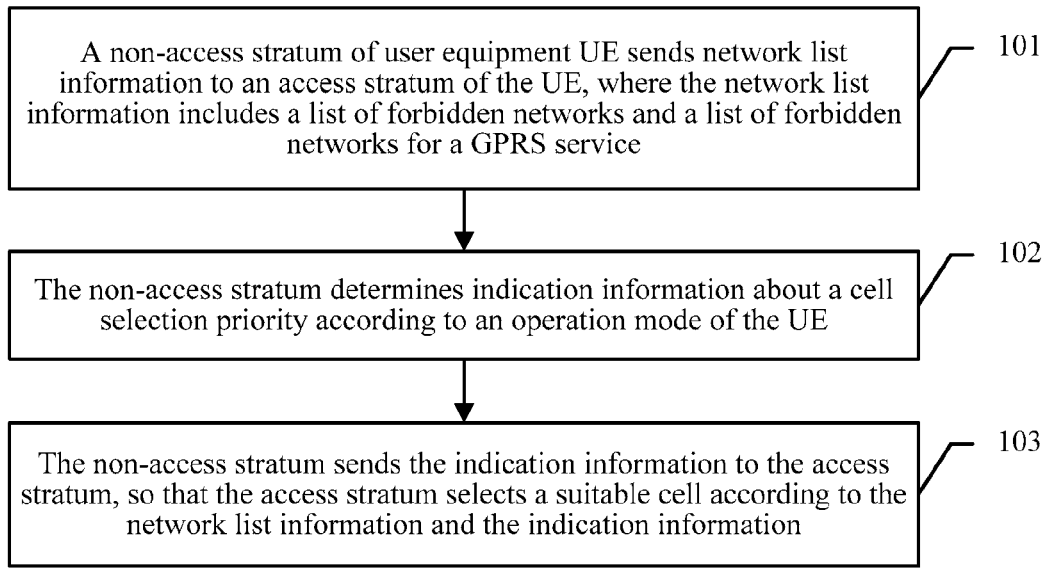
FIG. 1 is a schematic flowchart of an embodiment of a cell selection method according to the present invention.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

It should be understood that, although terms such as first and second may be used to describe each user or terminal in the embodiments of the present invention, the user or terminal is not limited to the terms. The terms are used only to distinguish users or terminals from each other. For example, without departing from the scope of the embodiments of the present invention, a first user may also be referred to as a second user; similarly, a second user may also be referred to as a first user; likewise, a second user may also be referred to as a third user, and so on. This is not limited in the embodiments of the present invention.

First, a technical problem to be resolved in the present invention and related functional modules and functions are described.

Before storing an EPLMN list, a UE needs to check a corresponding list of forbidden networks, specifically:

For a PS domain, before the UE stores an EPLMN list delivered in an attach accept message or a location update accept message by a network side, the UE checks whether an EPLMN is included in a list of forbidden networks or a list of forbidden networks for a GPRS service. If yes, the UE deletes, from the EPLMN list to be stored, the EPLMN included in the two lists of forbidden networks, that is, an EPLMN in the EPLMN list finally stored by the UE is not included in the list of forbidden networks or the list of forbidden networks for the GPRS service. For a CS domain, different from the PS domain, before the UE stores the EPLMN list delivered in the attach accept message or the location update accept message by the network side, the UE only checks whether an EPLMN is included in the list of forbidden networks, but does not check the list of forbidden networks for the GPRS service. If yes, the UE deletes, from the EPLMN list to be stored, the EPLMN included in the list of forbidden networks, that is, an EPLMN in the stored EPLMN list may be also included in the list of forbidden networks for the GPRS service. A main consideration for different processing in the CS domain and the PS domain is: the CS domain and the PS domain are independent in mobility management, and a CS service is not affected by a limited PS service.

For UE supporting both CS service and PS service, availability of the CS service and the PS service cannot be well considered in the foregoing solution. For example, in the following scenario, the UE may be caused to enter a state of being able to normally camp but unable to obtain a normal PS service.

Assuming that an operation mode of the UE is supporting the CS service and the PS service, and that PLMN A is in the list of forbidden networks for the GPRS service of the UE, and that none of PLMN A, PLMN B, and PLMN C is in the list of forbidden networks of the UE, the UE initiates a separate RAU (routing area update) in PLMN B due to an RA (routing area) change, and an SGSN (serving GPRS support node) sends an RAU accept message carrying an EPLMN list: {PLMN A, PLMN C};

after receiving the RAU accept message, the UE deletes PLMN A from the EPLMN list; therefore, the stored EPLMN list is: {PLMN B, PLMN C};

the UE initiates a separate LAU because a trigger condition (for example, a periodic LAU) for an LAU (location area update) is met, and an MSC (mobile switching center) sends an LAU accept message that also carries an EPLMN list: {PLMN A, PLMN C};

after receiving the LAU accept message, the UE does not delete PLMN A from the EPLMN list; therefore, the stored EPLMN list is: {PLMN A, PLMN B, PLMN C}; and an AS of the UE performs a cell reselection and enters PLMN A, and therefore enters the state of being able to normally camp but unable to obtain the normal PS service, and user experience is affected.

Related functional modules and functions in the present invention are as follows:

NAS of a UE:

(1) maintaining list information such as an EPLMN list, a list of forbidden location areas, a list of forbidden networks, and a list of forbidden networks for a GPRS service;

(2) performing a PLMN selection;

(3) providing information such as the EPLMN list, the list of forbidden location areas, and an RAT for an AS of the UE to perform a cell selection; and (4) performing a mobility management function such as registration.

AS of the UE:

(1) selecting a suitable cell according to the information provided by the NAS; and (2) normally camping on the suitable cell.

An embodiment of the present invention provides a cell selection method, and mainly a method performed by a cell selection apparatus. The following describes a cell selection method according to an embodiment of the present invention from a perspective of a NAS of UE.

Embodiment 1

It is mainly applicable to a scenario in which UE supporting CS service and PS service camps on a second generation (2G) or a 3G network, or UE supporting CS service and PS service moves between the 2G/3G network and an LTE (Long Term Evolution) network. Referring to FIG. 1, an embodiment of a cell selection method according to the present invention includes the following steps.

101. A non-access stratum of a user equipment UE sends network list information to an access stratum of the UE, where the network list information includes a list of forbidden networks and a list of forbidden networks for a GPRS service.

The NAS of the UE sends the network list information to the AS of the UE. The network list information includes the list of forbidden networks and the list of forbidden networks for the GPRS service.

It should be noted that, the NAS of the UE maintains the list information such as the EPLMN list, the list of forbidden networks, and the list of forbidden networks for the GPRS service in a mobility management procedure. For a specific process, refer to the prior art. Details are not described herein. In this step, in addition to the EPLMN list and a list of forbidden location areas that need to be delivered in the prior art, the NAS of the UE delivers the stored list of forbidden networks and the stored list of forbidden networks for the GPRS service to the AS of the UE. The GPRS service used in the list of forbidden networks for the GPRS service is a general term for all PS services, including a GPRS service in a 2G/3G network, an EPS service in an LTE network, and a PS service in a future 4.5G or 5G network.

It may be understood that, a network included in the list of forbidden networks is a network in which neither the GPRS service nor a non-GPRS service is available for the UE, and a network included in the list of forbidden networks for the GPRS service is a network in which the GPRS service is unavailable for the UE. The non-GPRS service is a general term for all CS services.

102. The non-access stratum determines indication information about a cell selection priority according to an operation mode of the UE.

The NAS determines the indication information about the cell selection priority according to the operation mode (Mode of Operation) of the UE.

That the NAS determines indication information about a cell selection priority according to an operation mode of the UE may include at least one of the following five cases:

a first case: the NAS of the UE determines, according to the operation mode of the UE, that the indication information is: selecting only a cell in which a CS service is available, where the operation mode of the UE is: supporting only the CS service (CS mode only); it may be understood that, if the operation mode of the UE is supporting only the CS service, the indication information is determined as: selecting only the cell in which the CS service is available;

a second case: the NAS of the UE determines, according to the operation mode of the UE, that the indication information is: selecting only a cell in which a PS service is available, where the operation mode of the UE is: supporting only the PS service (PS mode only); it may be understood that, if the operation mode of the UE is supporting only the PS service, the indication information is determined as: selecting only the cell in which the PS service is available;

a third case: the NAS of the UE determines, according to the operation mode of the UE, that the indication information is: selecting a cell in which both a CS service and a PS service are available, where the operation mode of the UE is: supporting the CS service and the PS service (CS/PS mode); it may be understood that, if the operation mode of the UE is supporting the CS service and the PS service, the indication information is determined as: selecting the cell in which both the CS service and the PS service are available;

a fourth case: the NAS of the UE determines, according to the operation mode of the UE, that the indication information is: preferentially selecting a cell in which both a CS service and a PS service are available, and if there is no such cell, selecting a cell in which the CS service is available, where the operation mode of the UE is: supporting the CS service and the PS service with the CS service preferred (CS/PS mode with CS prefer); it may be understood that, if the operation mode of the UE is supporting the CS service and the PS service with the CS service preferred, the indication information is determined as: preferentially selecting the cell in which both the CS service and the PS service are available, and if there is no such cell, selecting the cell in which the CS service is available; or a fifth case: the NAS of the UE determines, according to the operation mode of the UE, that the indication information is: selecting a cell in which both a CS service and a PS service are available, where the operation mode of the UE is: supporting the CS service and the PS service with the PS preferred (CS/PS mode with PS prefer); it may be understood that, if the operation mode of the UE is supporting the CS service and the PS service with the PS preferred, the indication information is determined as: selecting the cell in which both the CS service and the PS service are available.

103. The non-access stratum sends the indication information to the access stratum, so that the access stratum selects a suitable cell according to the network list information and the indication information.

The NAS sends the indication information to the AS, so that the AS selects the suitable cell according to the network list information and the indication information. It should be noted that:

if the indication information sent by the NAS of the UE to the AS of the UE is: selecting only the cell in which the CS service is available, the AS of the UE selects a first cell according to the network list information and the indication information that are provided, in addition to referring to a 3GPP-defined condition for selecting a suitable cell, where a network to which the first cell belongs is not in the list of forbidden networks;

if the indication information sent by the NAS of the UE to the AS of the UE is: selecting only the cell in which the PS service is available, the AS of the UE selects a second cell according to the network list information and the indication information that are provided, in addition to referring to a 3GPP-defined condition for selecting a suitable cell, where a network to which the second cell belongs is not in the list of forbidden networks and the list of forbidden networks for the GPRS service;

if the indication information sent by the NAS of the UE to the AS of the UE is: selecting the cell in which both the CS service and the PS service are available, the AS of the UE selects a third cell according to the network list information and the indication information that are provided, in addition to referring to a 3GPP-defined condition for selecting a suitable cell, where a network to which the third cell belongs is not in the list of forbidden networks and the list of forbidden networks for the GPRS service; or if the indication information sent by the NAS of the UE to the AS of the UE is: preferentially selecting the cell in which both the CS service and the PS service are available, and if there is no such cell, selecting the cell in which the CS service is available, the AS of the UE selects a fourth cell according to the network list information and the indication information that are provided, in addition to referring to a 3GPP-defined condition for selecting a suitable cell, and if there is no such cell, selects a fifth cell, where a network to which the fourth cell belongs is not in the list of forbidden networks and the list of forbidden networks for the GPRS service, and a network to which the fifth cell belongs is not in the list of forbidden networks.

In this embodiment of the present invention, the NAS of the user equipment UE sends the network list information to the AS of the UE, where the network list information includes the list of forbidden networks and the list of forbidden networks for a GPRS service; the NAS of the UE determines the indication information about the cell selection priority according to the operation mode of the UE; and the NAS of the UE sends the indication information to the AS of the UE, so that the AS of the UE selects a suitable cell according to the network list information and the indication information. Therefore, the UE is prevented from entering a state of being able to normally camp but unable to obtain a normal service, and user experience is improved.

Embodiment 2

Figure 2:
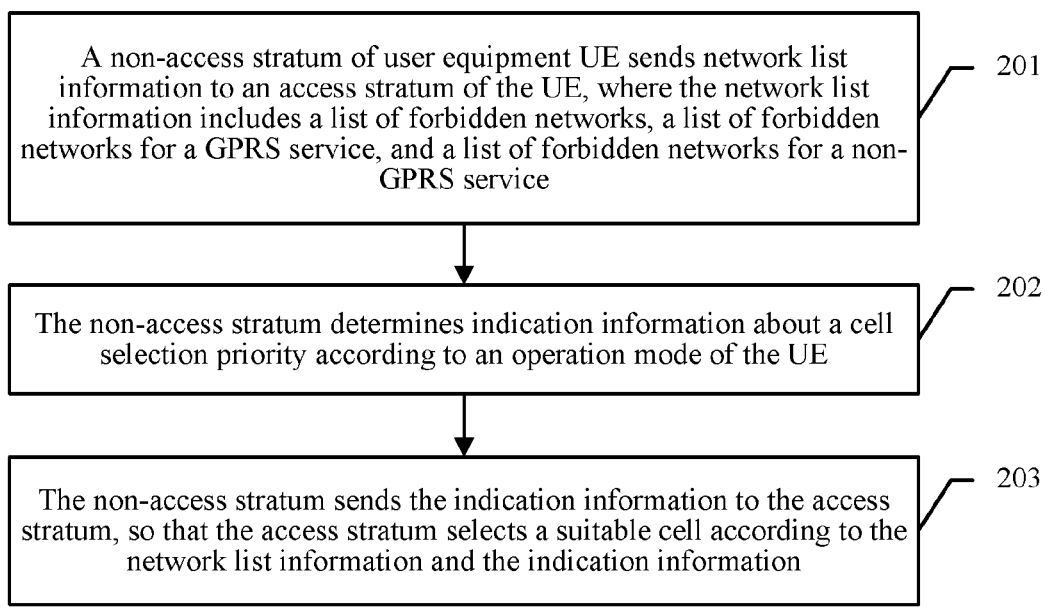
FIG. 2 is a schematic flowchart of another embodiment of a cell selection method according to the present invention.

It is mainly applicable to a scenario in which UE supporting CS service and PS service camps on an LTE network or a future 4.5G/5G network that supports only the PS service. Referring to FIG. 2, another embodiment of a cell selection method according to the present invention includes the following steps.

201. A non-access stratum of user equipment UE sends network list information to an access stratum of the UE, where the network list information includes a list of forbidden networks, a list of forbidden networks for a GPRS service, and a list of forbidden networks for a non-GPRS service.

The NAS of the UE sends the network list information to the AS of the UE. The network list information includes the list of forbidden networks, the list of forbidden networks for the GPRS service, and the list of forbidden networks for the non-GPRS service (forbidden PLMNs for non-GPRS service).

It should be noted that, the NAS of the UE maintains list information such as the EPLMN list, the list of forbidden networks, and the list of forbidden networks for the GPRS service in a mobility management procedure. For a specific process, refer to the prior art. Details are not described herein. In this step, the NAS of the UE further maintains the list of forbidden networks for the non-GPRS service. Specifically, the NAS of the user equipment UE adds, to the list of forbidden networks for the non-GPRS service, a network in which the non-GPRS service is unavailable, where the network in which the non-GPRS service is unavailable is a network that rejects a non-GPRS service registration request sent by the UE. For example, if UE supporting a CS service and a PS service roams to a network that supports only the PS service (for example, an LTE/4.5G/5G network), after the UE receives a CS service reject indication (for example, a cause value "CS domain not available"), the NAS of the UE adds a current PLMN to the list of forbidden networks for the non-GPRS service. It should be noted that, herein registration with a PS domain is successful. The non-GPRS service used in the list of forbidden networks for the non-GPRS service is a general term for all CS services.

It should be noted that, in addition to the EPLMN list and a list of forbidden location areas that need to be delivered in the prior art, the NAS of the UE delivers the stored list of forbidden networks, the stored list of forbidden networks for the GPRS service, and the stored list of forbidden networks for the non-GPRS service to the AS of the UE. The GPRS service used in the list of forbidden networks for the GPRS service is a general term for all PS services, including a GPRS service in a 2G/3G network, an EPS service in an LTE network, and a PS service in a future 4.5G or 5G network.

It may be understood that, a network included in the list of forbidden networks is a network in which neither the GPRS service nor the non-GPRS service is available for the UE, and a network included in the list of forbidden networks for the GPRS service is a network in which the GPRS service is unavailable for the UE, and a network included in the list of forbidden networks for the non-GPRS service is a network in which the non-GPRS service is unavailable for the UE.

202. The non-access stratum determines indication information about a cell selection priority according to an operation mode of the UE.

The NAS determines the indication information about the cell selection priority according to the operation mode (Mode of Operation) of the UE.

That the NAS determines indication information about a cell selection priority according to an operation mode of the UE may include at least one of the following five cases:

a first case: the NAS of the UE determines, according to the operation mode of the UE, that the indication information is: selecting only a cell in which a CS service is available, where the operation mode of the UE is: supporting only the CS service; it may be understood that, if the operation mode of the UE is supporting only the CS service, the indication information is determined as: selecting only the cell in which the CS service is available;

a second case: the NAS of the UE determines, according to the operation mode of the UE, that the indication information is: selecting only a cell in which a PS service is available, where the operation mode of the UE is: supporting only the PS service; it may be understood that, if the operation mode of the UE is supporting only the PS service, the indication information is determined as: selecting only the cell in which the PS service is available;

a third case: the NAS of the UE determines, according to the operation mode of the UE, that the indication information is: selecting a cell in which both a CS service and a PS service are available, where the operation mode of the UE is: supporting the CS service and the PS service; it may be understood that, if the operation mode of the UE is supporting the CS service and the PS service, the indication information is determined as: selecting the cell in which both the CS service and the PS service are available;

a fourth case: the NAS of the UE determines, according to the operation mode of the UE, that the indication information is: preferentially selecting a cell in which both a CS service and a PS service are available, and if there is no such cell, selecting a cell in which the CS service is available, where the operation mode of the UE is: supporting the CS service and the PS service with the CS service preferred; it may be understood that, if the operation mode of the UE is supporting the CS service and the PS service with the CS service preferred, the indication information is determined as: preferentially selecting the cell in which both the CS service and the PS service are available, and if there is no such cell, selecting the cell in which the CS service is available; or a fifth case: the NAS of the UE determines, according to the operation mode of the UE, that the indication information is: preferentially selecting a cell in which both a CS service and a PS service are available, and if there is no such cell, selecting a cell in which the PS service is available, where the operation mode of the UE is: supporting the CS service and the PS service with the PS preferred; it may be understood that, if the operation mode of the UE is supporting the CS service and the PS service with the PS preferred, the indication information is determined as: preferentially selecting the cell in which both the CS service and the PS service are available, and if there is no such cell, selecting the cell in which the PS service is available.

203. The non-access stratum sends the indication information to the access stratum, so that the access stratum selects a suitable cell according to the network list information and the indication information.

The NAS sends the indication information to the AS, so that the AS selects the suitable cell according to the network list information and the indication information. It should be noted that:

if the indication information sent by the NAS of the UE to the AS of the UE is: selecting only the cell in which the CS service is available, the AS of the UE selects a first cell according to the network list information and the indication information that are provided, in addition to referring to a 3GPP-defined condition for selecting a suitable cell, where a network to which the first cell belongs is not in the list of forbidden networks and the list of forbidden networks for the non-GPRS service;

if the indication information sent by the NAS of the UE to the AS of the UE is: selecting only the cell in which the PS service is available, the AS of the UE selects a second cell according to the network list information and the indication information that are provided, in addition to referring to a 3GPP-defined condition for selecting a suitable cell, where a network to which the second cell belongs is not in the list of forbidden networks and the list of forbidden networks for the GPRS service;

if the indication information sent by the NAS of the UE to the AS of the UE is: selecting the cell in which both the CS service and the PS service are available, the AS of the UE selects a third cell according to the network list information and the indication information that are provided, in addition to referring to a 3GPP-defined condition for selecting a suitable cell, where a network to which the third cell belongs is not in the list of forbidden networks, the list of forbidden networks for the GPRS service, and the list of forbidden networks for the non-GPRS service;

if the indication information sent by the NAS of the UE to the AS of the UE is: preferentially selecting the cell in which both the CS service and the PS service are available, and if there is no such cell, selecting the cell in which the CS service is available, the AS of the UE selects a fourth cell according to the network list information and the indication information that are provided, in addition to referring to a 3GPP-defined condition for selecting a suitable cell, and if there is no such cell, selects a fifth cell, where a network to which the fourth cell belongs is not in the list of forbidden networks, the list of forbidden networks for the GPRS service, and the list of forbidden networks for the non-GPRS service, and a network to which the fifth cell belongs is not in the list of forbidden networks and the list of forbidden networks for the non-GPRS service; or if the indication information sent by the NAS of the UE to the AS of the UE is: preferentially selecting the cell in which both the CS service and the PS service are available, and if there is no such cell, selecting the cell in which the PS service is available, the AS of the UE preferentially selects a sixth cell according to the network list information and the indication information that are provided, in addition to referring to a 3GPP-defined condition for selecting a suitable cell, and if there is no such cell, selects a seventh cell, where a network to which the sixth cell belongs is not in the list of forbidden networks, the list of forbidden networks for the GPRS service, and the list of forbidden networks for the non-GPRS service, and a network to which the seventh cell belongs is not in the list of forbidden networks and the list of forbidden networks for the GPRS service.

In this embodiment of the present invention, the NAS of the user equipment UE sends the network list information to the AS of the UE, where the network list information includes the list of forbidden networks, the list of forbidden networks for a GPRS service, and the list of forbidden networks for a non-GPRS service; the NAS of the UE determines the indication information about the cell selection priority according to the operation mode of the UE; and the NAS of the UE sends the indication information to the AS of the UE, so that the AS of the UE selects a suitable cell according to the network list information and the indication information. Therefore, the UE is prevented from entering a state of being able to normally camp but unable to obtain a normal service, and user experience is improved.

The foregoing describes the cell selection method according to the present invention from the perspective of the NAS of the UE. The following description is provided from a perspective of an AS of UE.

Embodiment 3

Figure 3:
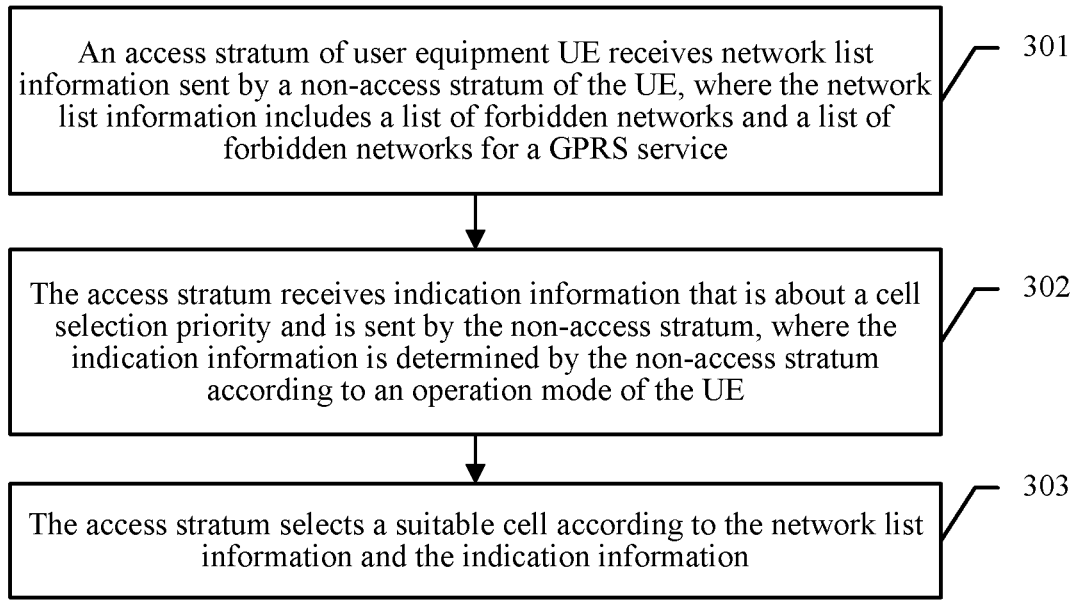
FIG. 3 is a schematic flowchart of another embodiment of a cell selection method according to the present invention.

It is mainly applicable to a scenario in which UE supporting CS service and PS service camps on a 2G/3G network or UE supporting CS service and PS service moves between a 2G/3G network and an LTE network. Referring to FIG. 3, another embodiment of a cell selection method according to the present invention includes the following steps.

301. An access stratum of user equipment UE receives network list information sent by a non-access stratum of the UE, where the network list information includes a list of forbidden networks and a list of forbidden networks for a GPRS service.

The AS of the UE receives the network list information sent by the NAS of the UE. The network list information includes the list of forbidden networks and the list of forbidden networks for the GPRS service. For related descriptions, refer to step 101 in the corresponding Embodiment 1. Details are not described again herein.

302. The access stratum receives indication information that is about a cell selection priority and is sent by the non-access stratum, where the indication information is determined by the non-access stratum according to an operation mode of the UE.

The AS of the UE receives the indication information that is about the cell selection priority and is sent by the NAS of the UE. The indication information is determined by the NAS of the UE according to the operation mode (Mode of Operation) of the UE. For related descriptions, refer to step 102 in the corresponding Embodiment 1. Details are not described again herein.

303. The access stratum selects a suitable cell according to the network list information and the indication information.

The AS of the UE selects the suitable cell according to the network list information and the indication information.

That the AS of the UE selects a suitable cell according to the network list information and the indication information includes at least one of the following four cases:

a first case: the AS of the UE selects a first cell according to the network list information and the indication information that are provided, in addition to referring to a 3GPP-defined condition for selecting a suitable cell, where a network to which the first cell belongs is not in the list of forbidden networks, and the indication information is: selecting only a cell in which a CS service is available;

a second case: the AS of the UE selects a second cell according to the network list information and the indication information that are provided, in addition to referring to a 3GPP-defined condition for selecting a suitable cell, where a network to which the second cell belongs is not in the list of forbidden networks and the list of forbidden networks for the GPRS service, and the indication information is: selecting only a cell in which a PS service is available;

a third case: the AS of the UE selects a third cell according to the network list information and the indication information that are provided, in addition to referring to a 3GPP-defined condition for selecting a suitable cell, where a network to which the third cell belongs is not in the list of forbidden networks and the list of forbidden networks for the GPRS service, and the indication information is: selecting a cell in which both a CS service and a PS service are available; or a fourth case: the AS of the UE preferentially selects a fourth cell according to the network list information and the indication information that are provided, in addition to referring to a 3GPP-defined condition for selecting a suitable cell, and if there is no such cell, selects a fifth cell, where a network to which the fourth cell belongs is not in the list of forbidden networks and the list of forbidden networks for the GPRS service, a network to which the fifth cell belongs is not in the list of forbidden networks, and the indication information is: preferentially selecting a cell in which both a CS service and a PS service are available, and if there is no such cell, selecting a cell in which the CS service is available.

In this embodiment of the present invention, the AS of the user equipment UE receives the network list information sent by the NAS of the UE, where the network list information includes the list of forbidden networks and the list of forbidden networks for a GPRS service; the AS of the UE receives the indication information that is about the cell selection priority and is sent by the NAS of the UE, where the indication information is determined by the NAS of the UE according to the operation mode of the UE; and the AS of the UE selects a suitable cell according to the network list information and the indication information. Therefore, the UE is prevented from entering a state of being able to normally camp but unable to obtain a normal service, and user experience is improved.

Embodiment 4

Figure 4:
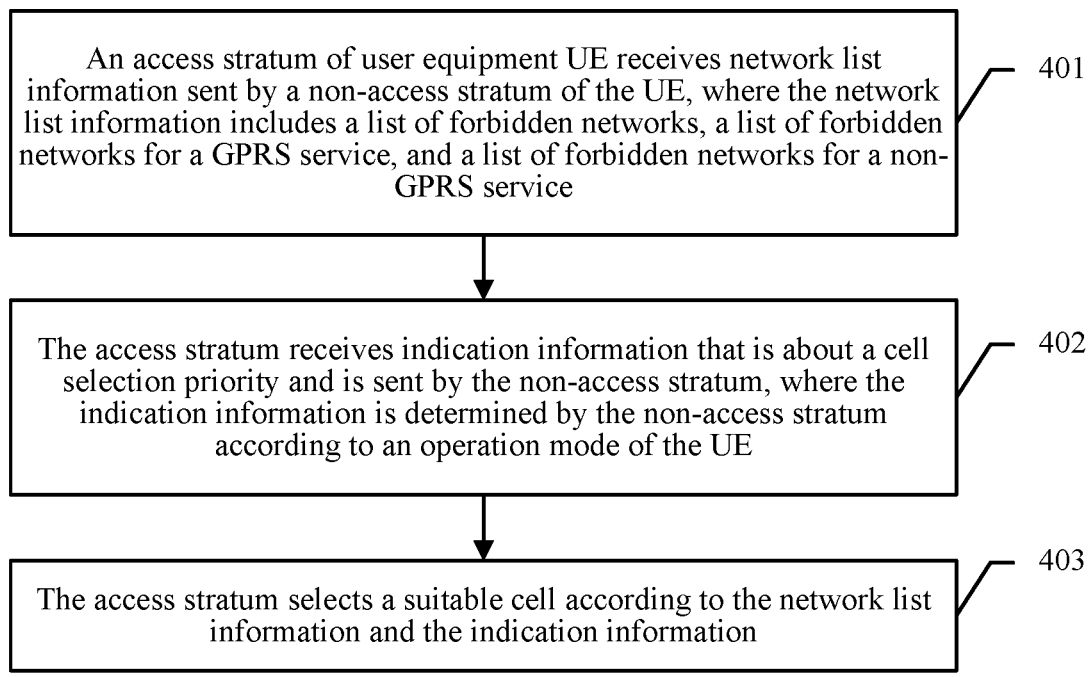
FIG. 4 is a schematic flowchart of another embodiment of a cell selection method according to the present invention.

It is mainly applicable to a scenario in which UE supporting CS service and PS service camps on an LTE network or a future 4.5G/5G network that supports only the PS service. Referring to FIG. 4, another embodiment of a cell selection method according to the present invention includes the following steps.

401. An access stratum of a user equipment UE receives network list information sent by a non-access stratum of the UE, where the network list information includes a list of forbidden networks, a list of forbidden networks for a GPRS service, and a list of forbidden networks for a non-GPRS service.

The AS of the user equipment UE receives the network list information sent by the NAS of the UE. The network list information includes the list of forbidden networks, the list of forbidden networks for the GPRS service, and the list of forbidden networks for the non-GPRS service. For related descriptions, refer to step 201 in the corresponding Embodiment 2. Details are not described again herein.

402. The access stratum receives indication information that is about a cell selection priority and is sent by the non-access stratum, where the indication information is determined by the non-access stratum according to an operation mode of the UE.

The AS of the UE receives the indication information that is about the cell selection priority and is sent by the NAS of the UE. The indication information is determined by the NAS of the UE according to the operation mode of the UE. For related descriptions, refer to step 202 in the corresponding Embodiment 2. Details are not described again herein.

403. The access stratum selects a suitable cell according to the network list information and the indication information.

The AS of the UE selects the suitable cell according to the network list information and the indication information.

That the AS of the UE selects a suitable cell according to the network list information and the indication information includes at least one of the following five cases:

a first case: the AS of the UE selects a first cell according to the network list information and the indication information that are provided, in addition to referring to a 3GPP-defined condition for selecting a suitable cell, where a network to which the first cell belongs is not in the list of forbidden networks and the list of forbidden networks for the non-GPRS service, and the indication information is: selecting only a cell in which a CS service is available;

a second case: the AS of the UE selects a second cell according to the network list information and the indication information that are provided, in addition to referring to a 3GPP-defined condition for selecting a suitable cell, where a network to which the second cell belongs is not in the list of forbidden networks and the list of forbidden networks for the GPRS service, and the indication information is: selecting only a cell in which a PS service is available;

a third case: the AS of the UE selects a third cell according to the network list information and the indication information that are provided, in addition to referring to a 3GPP-defined condition for selecting a suitable cell, where a network to which the third cell belongs is not in the list of forbidden networks, the list of forbidden networks for the GPRS service, and the list of forbidden networks for the non-GPRS service, and the indication information is: selecting a cell in which both a CS service and a PS service are available;

a fourth case: the AS of the UE preferentially selects a fourth cell according to the network list information and the indication information that are provided, in addition to referring to a 3GPP-defined condition for selecting a suitable cell, and if there is no such cell, selects a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the indication information is: preferentially selecting a cell in which both a CS service and a PS service are available, and if there is no such cell, selecting a cell in which the CS service is available; or a fifth case: the AS of the UE preferentially selects a sixth cell according to the network list information and the indication information that are provided, in addition to referring to a 3GPP-defined condition for selecting a suitable cell, and if there is no such cell, selects a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the indication information is: preferentially selecting a cell in which both a CS service and a PS service are available, and if there is no such cell, selecting a cell in which the PS service is available.

In this embodiment of the present invention, the AS of the user equipment UE receives the network list information sent by the NAS of the UE, where the network list information includes the list of forbidden networks, the list of forbidden networks for a GPRS service, and the list of forbidden networks for a non-GPRS service; the AS of the UE receives the indication information that is about the cell selection priority and is sent by the NAS of the UE, where the indication information is determined by the NAS of the UE according to the operation mode of the UE; and the AS of the UE selects a suitable cell according to the network list information and the indication information. Therefore, the UE is prevented from entering a state of being able to normally camp but unable to obtain a normal service, and user experience is improved.

The NAS of the UE in the foregoing embodiment determines the indication information about the cell selection priority according to the operation mode of the UE, and sends the indication information to the AS of the UE. The following embodiment provides another implementation, that is, the NAS of the UE directly provides operation mode information of the UE to the AS of the UE, instead of providing the indication information that is about the cell selection priority and is determined according to the operation mode. From a perspective of an encoding mode for information transfer, encoding modes used in the two embodiments are consistent, and only meanings of encoded information are different, but functions of the information are the same for the AS of the UE. Likewise, first, a description is provided from a perspective of a NAS of UE.

Embodiment 5

Figure 5:
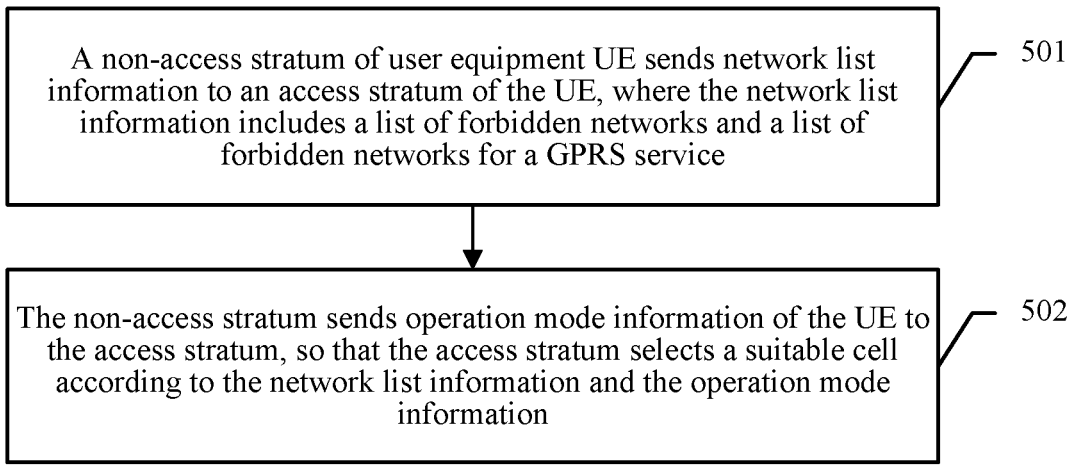
FIG. 5 is a schematic flowchart of another embodiment of a cell selection method according to the present invention.

It is mainly applicable to a scenario in which UE supporting CS service and PS service camps on a 2G/3G network or UE supporting CS service and PS service moves between a 2G/3G network and an LTE network. Referring to FIG. 5, another embodiment of a cell selection method according to the present invention includes the following steps.

501. A non-access stratum of a user equipment UE sends network list information to an access stratum of the UE, where the network list information includes a list of forbidden networks and a list of forbidden networks for a GPRS service.

The NAS of the user equipment UE sends the network list information to the AS of the UE. The network list information includes the list of forbidden networks and the list of forbidden networks for the GPRS service. For related descriptions, refer to step 101 in the corresponding Embodiment 1. Details are not described again herein.

502. The non-access stratum sends operation mode information of the UE to the access stratum, so that the access stratum selects a suitable cell according to the network list information and the operation mode information.

The NAS of the UE sends the operation mode information of the UE to the AS of the UE, so that the AS of the UE selects the suitable cell according to the network list information and the operation mode information.

The operation mode information of the UE includes at least one of the following five cases:

a first case: supporting only a CS service;

a second case: supporting only a PS service;

a third case: supporting a CS service and a PS service;

a fourth case: supporting a CS service and a PS service with the CS service preferred; or a fifth case: supporting a CS service and a PS service with the PS service preferred.

It should be noted that: if the operation mode information of the UE is supporting only the CS service, the AS of the UE selects a first cell according to the network list information and the operation mode information that are provided, in addition to referring to a 3GPP-defined condition for selecting a suitable cell, where a network to which the first cell belongs is not in the list of forbidden networks;

if the operation mode information of the UE is supporting only the PS service, the AS of the UE selects a second cell according to the network list information and the operation mode information that are provided, in addition to referring to a 3GPP-defined condition for selecting a suitable cell, where a network to which the second cell belongs is not in the list of forbidden networks and the list of forbidden networks for the GPRS service;

if the operation mode information of the UE is supporting the CS service and the PS service, the AS of the UE selects a third cell according to the network list information and the operation mode information that are provided, in addition to referring to a 3GPP-defined condition for selecting a suitable cell, where a network to which the third cell belongs is not in the list of forbidden networks and the list of forbidden networks for the GPRS service;

if the operation mode information of the UE is supporting the CS service and the PS service with the CS service preferred, the AS of the UE preferentially selects a fourth cell according to the network list information and the operation mode information that are provided, in addition to referring to a 3GPP-defined condition for selecting a suitable cell, and if there is no such cell, selects a fifth cell, where a network to which the fourth cell belongs is not in the list of forbidden networks and the list of forbidden networks for the GPRS service, and a network to which the fifth cell belongs is not in the list of forbidden networks; or if the operation mode information of the UE is supporting the CS service and the PS service with the PS service preferred, the AS of the UE selects a sixth cell according to the network list information and the operation mode information that are provided, in addition to referring to a 3GPP-defined condition for selecting a suitable cell, where a network to which the sixth cell belongs is not in the list of forbidden networks and the list of forbidden networks for the GPRS service.

In this embodiment of the present invention, the NAS of the user equipment UE sends the network list information to the AS of the UE, where the network list information includes the list of forbidden networks and the list of forbidden networks for a GPRS service; and the NAS of the UE sends the operation mode information of the UE to the AS of the UE, so that the AS of the UE selects a suitable cell according to the network list information and the operation mode information. Therefore, the UE is prevented from entering a state of being able to normally camp but unable to obtain a normal service, and user experience is improved.

Embodiment 6

Figure 6:
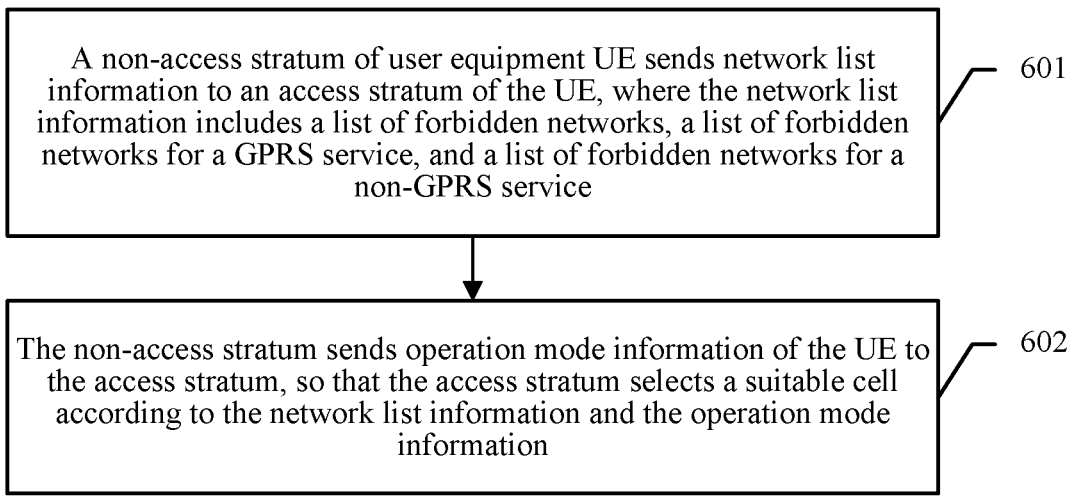
FIG. 6 is a schematic flowchart of another embodiment of a cell selection method according to the present invention.

It is mainly applicable to a scenario in which UE supporting CS service and PS service camps on an LTE network or a future 4.5G/5G network that supports only the PS service. Referring to FIG. 6, another embodiment of a cell selection method according to the present invention includes the following steps.

601. A non-access stratum of a user equipment UE sends network list information to an access stratum of the UE, where the network list information includes a list of forbidden networks, a list of forbidden networks for a GPRS service, and a list of forbidden networks for a non-GPRS service.

The NAS of the user equipment UE sends the network list information to the AS of the UE. The network list information includes the list of forbidden networks, the list of forbidden networks for the GPRS service, and the list of forbidden networks for the non-GPRS service. For related descriptions, refer to step 201 in the corresponding Embodiment 2. Details are not described again herein.

602. The non-access stratum sends operation mode information of the UE to the access stratum, so that the access stratum selects a suitable cell according to the network list information and the operation mode information.

The NAS of the UE sends the operation mode information of the UE to the AS of the UE, so that the AS of the UE selects the suitable cell according to the network list information and the operation mode information.

Based on the descriptions about step 502 in Embodiment 5, in this step, it should be additionally noted that:

if the operation mode information of the UE sent by the NAS of the UE to the AS of the UE is supporting only a CS service, the AS of the UE selects a first cell according to the network list information and the operation mode information that are provided, in addition to referring to a 3GPP-defined condition for selecting a suitable cell, where a network to which the first cell belongs is not in the list of forbidden networks and the list of forbidden networks for the non-GPRS service;

if the operation mode information of the UE sent by the NAS of the UE to the AS of the UE is supporting only a PS service, the AS of the UE selects a second cell according to the network list information and the operation mode information that are provided, in addition to referring to a 3GPP-defined condition for selecting a suitable cell, where a network to which the second cell belongs is not in the list of forbidden networks and the list of forbidden networks for the GPRS service;

if the operation mode information of the UE sent by the NAS of the UE to the AS of the UE is supporting a CS service and a PS service, the AS of the UE selects a third cell according to the network list information and the operation mode information that are provided, in addition to referring to a 3GPP-defined condition for selecting a suitable cell, where a network to which the third cell belongs is not in the list of forbidden networks, the list of forbidden networks for the GPRS service, and the list of forbidden networks for the non-GPRS service;

if the operation mode information of the UE sent by the NAS of the UE to the AS of the UE is: supporting a CS service and a PS service with the CS service preferred, the AS of the UE preferentially selects a fourth cell according to the network list information and the operation mode information that are provided, in addition to referring to a 3GPP-defined condition for selecting a suitable cell, and if there is no such cell, selects a fifth cell, where a network to which the fourth cell belongs is not in the list of forbidden networks, the list of forbidden networks for the GPRS service, and the list of forbidden networks for the non-GPRS service, and a network to which the fifth cell belongs is not in the list of forbidden networks and the list of forbidden networks for the non-GPRS service; or if the operation mode information of the UE sent by the NAS of the UE to the AS of the UE is: supporting a CS service and a PS service with the PS service preferred, the AS of the UE preferentially selects a sixth cell according to the network list information and the operation mode information that are provided, in addition to referring to a 3GPP-defined condition for selecting a suitable cell, and if there is no such cell, selects a seventh cell, where a network to which the sixth cell belongs is not in the list of forbidden networks, the list of forbidden networks for the GPRS service, and the list of forbidden networks for the non-GPRS service, and a network to which the seventh cell belongs is not in the list of forbidden networks and the list of forbidden networks for the GPRS service.

In this embodiment of the present invention, the NAS of the user equipment UE sends the network list information to the AS of the UE, where the network list information includes the list of forbidden networks, the list of forbidden networks for a GPRS service, and the list of forbidden networks for a non-GPRS service; and the NAS of the UE sends the operation mode information of the UE to the AS of the UE, so that the AS of the UE selects a suitable cell according to the network list information and the operation mode information. Therefore, the UE is prevented from entering a state of being able to normally camp but unable to obtain a normal service, and user experience is improved.

The following description is provided from a perspective of an AS of UE.

Embodiment 7

Figure 7:
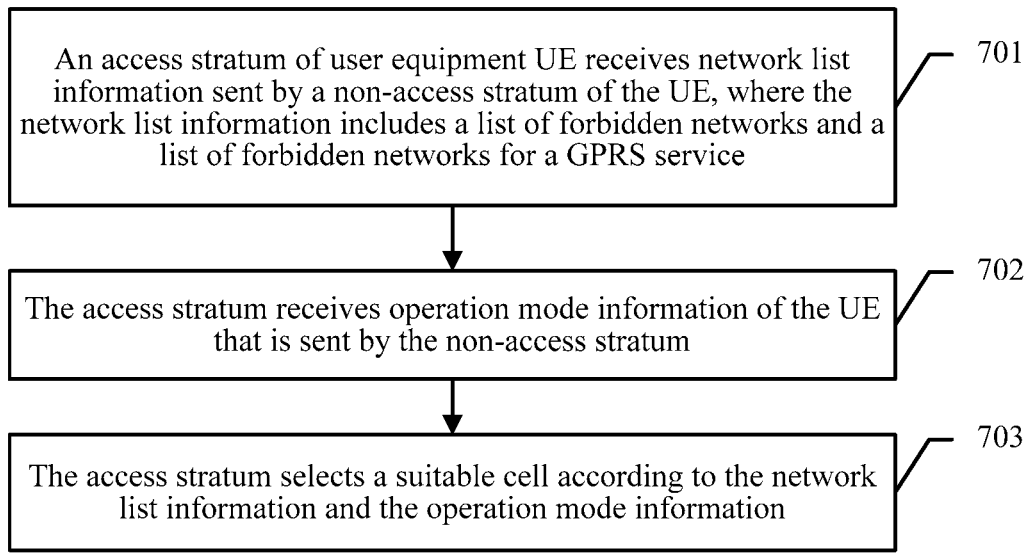
FIG. 7 is a schematic flowchart of another embodiment of a cell selection method according to the present invention.

It is mainly applicable to a scenario in which UE supporting CS service and PS service camps on a 2G/3G network or UE supporting CS service and PS service moves between a 2G/3G network and an LTE network. Referring to FIG. 7, another embodiment of a cell selection method according to the present invention includes the following steps.

701. An access stratum of a user equipment UE receives network list information sent by a non-access stratum of the UE, where the network list information includes a list of forbidden networks and a list of forbidden networks for a GPRS service.

The AS of the user equipment UE receives the network list information sent by the NAS of the UE. The network list information includes the list of forbidden networks and the list of forbidden networks for the GPRS service. For related descriptions, refer to step 101 in the corresponding Embodiment 1. Details are not described again herein.

702. The access stratum receives operation mode information of the UE that is sent by the non-access stratum.

The AS of the UE receives the operation mode information of the UE that is sent by the NAS of the UE. For related descriptions, refer to step 502 in the corresponding Embodiment 5. Details are not described again herein.

703. The access stratum selects a suitable cell according to the network list information and the operation mode information.

The AS of the UE selects the suitable cell according to the network list information and the operation mode information.

That the AS of the UE selects a suitable cell according to the network list information and the operation mode information includes at least one of the following five cases:

a first case: the AS of the UE selects a first cell according to the network list information and the operation mode information that are provided, in addition to referring to a 3GPP-defined condition for selecting a suitable cell, where a network to which the first cell belongs is not in the list of forbidden networks, and the operation mode information is: supporting only a CS service;

a second case: the AS of the UE selects a second cell according to the network list information and the operation mode information that are provided, in addition to referring to a 3GPP-defined condition for selecting a suitable cell, where a network to which the second cell belongs is not in the list of forbidden networks and the list of forbidden networks for the GPRS service, and the operation mode information is: supporting only a PS service;

a third case: the AS of the UE selects a third cell according to the network list information and the operation mode information that are provided, in addition to referring to a 3GPP-defined condition for selecting a suitable cell, where a network to which the third cell belongs is not in the list of forbidden networks and the list of forbidden networks for the GPRS service, and the operation mode information is: supporting a CS service and a PS service;

a fourth case: the AS of the UE preferentially selects a fourth cell according to the network list information and the operation mode information that are provided, in addition to referring to a 3GPP-defined condition for selecting a suitable cell, and if there is no such cell, selects a fifth cell, where a network to which the fourth cell belongs is not in the list of forbidden networks and the list of forbidden networks for the GPRS service, a network to which the fifth cell belongs is not in the list of forbidden networks, and the operation mode information is: supporting a CS service and a PS service with the CS service preferred; or a fifth case: the AS of the UE selects a sixth cell according to the network list information and the operation mode information that are provided, in addition to referring to a 3GPP-defined condition for selecting a suitable cell, where a network to which the sixth cell belongs is not in the list of forbidden networks and the list of forbidden networks for the GPRS service, and the operation mode information is: supporting a CS service and a PS service with the PS service preferred.

In this embodiment of the present invention, the AS of the user equipment UE receives the network list information sent by the NAS of the UE, where the network list information includes the list of forbidden networks and the list of forbidden networks for a GPRS service; the AS of the UE receives the operation mode information of the UE that is sent by the NAS of the UE; and the AS of the UE selects a suitable cell according to the network list information and the operation mode information. Therefore, the UE is prevented from entering a state of being able to normally camp but unable to obtain a normal service, and user experience is improved.

Embodiment 8

Figure 8:
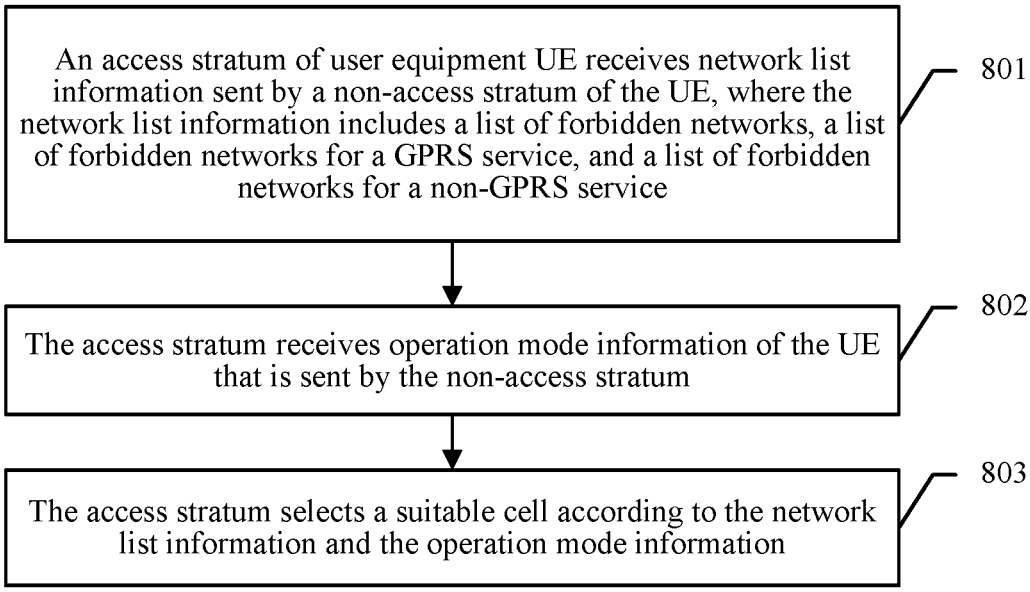
FIG. 8 is a schematic flowchart of another embodiment of a cell selection method according to the present invention.

It is mainly applicable to a scenario in which UE supporting CS service and PS service camps on an LTE network or a future 4.5G/5G network that supports only the PS service. Referring to FIG. 8, another embodiment of a cell selection method according to the present invention includes the following steps.

801. An access stratum of a user equipment UE receives network list information sent by a non-access stratum of the UE, where the network list information includes a list of forbidden networks, a list of forbidden networks for a GPRS service, and a list of forbidden networks for a non-GPRS service.

The AS of the user equipment UE receives the network list information sent by the NAS of the UE. The network list information includes the list of forbidden networks, the list of forbidden networks for the GPRS service, and the list of forbidden networks for the non-GPRS service. For related descriptions, refer to step 201 in the corresponding Embodiment 2. Details are not described again herein.

802. The access stratum receives operation mode information of the UE that is sent by the non-access stratum.

The AS of the UE receives the operation mode information of the UE that is sent by the NAS of the UE. For related descriptions, refer to step 502 in the corresponding Embodiment 5. Details are not described again herein.

803. The access stratum selects a suitable cell according to the network list information and the operation mode information.

The AS of the UE selects the suitable cell according to the network list information and the operation mode information.

That the AS of the UE selects a suitable cell according to the network list information and the operation mode information includes at least one of the following five cases:

a first case: the AS of the UE selects a first cell according to the network list information and the operation mode information that are provided, in addition to referring to a 3GPP-defined condition for selecting a suitable cell, where a network to which the first cell belongs is not in the list of forbidden networks and the list of forbidden networks for the non-GPRS service, and the operation mode information is: supporting only a CS service;

a second case: the AS of the UE selects a second cell according to the network list information and the operation mode information that are provided, in addition to referring to a 3GPP-defined condition for selecting a suitable cell, where a network to which the second cell belongs is not in the list of forbidden networks and the list of forbidden networks for the GPRS service, and the operation mode information is: supporting only a PS service;

a third case: the AS of the UE selects a third cell according to the network list information and the operation mode information that are provided, in addition to referring to a 3GPP-defined condition for selecting a suitable cell, where a network to which the third cell belongs is not in the list of forbidden networks, the list of forbidden networks for the GPRS service, and the list of forbidden networks for the non-GPRS service, and the operation mode information is: supporting a CS service and a PS service;

a fourth case: the AS of the UE preferentially selects a fourth cell according to the network list information and the operation mode information that are provided, in addition to referring to a 3GPP-defined condition for selecting a suitable cell, and if there is no such cell, selects a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the operation mode information is: supporting a CS service and a PS service with the CS service preferred; or a fifth case: the AS of the UE preferentially selects a sixth cell according to the network list information and the operation mode information that are provided, in addition to referring to a 3GPP-defined condition for selecting a suitable cell, and if there is no such cell, selects a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the operation mode information is: supporting a CS service and a PS service with the PS service preferred.

In this embodiment of the present invention, the AS of the user equipment UE receives the network list information sent by the NAS of the UE, where the network list information includes the list of forbidden networks, the list of forbidden networks for a GPRS service, and the list of forbidden networks for a non-GPRS service; the AS of the UE receives the operation mode information of the UE that is sent by the NAS of the UE; and the AS of the UE selects a suitable cell according to the network list information and the operation mode information. Therefore, the UE is prevented from entering a state of being able to normally camp but unable to obtain a normal service, and user experience is improved.

For ease of understanding, the following describes a cell selection method in an embodiment of the present invention by using a specific application scenario.

System architectures to which the present invention is applied are mainly 2G, 3G, and LTE architectures defined by the 3GPP.

There are three typical scenarios to which the present invention is applied: UE supporting CS service and PS service camps on a 2G/3G network, or UE supporting CS service and PS service moves between a 2G/3G network and an LTE network, or UE supporting CS service and PS service camps on an LTE network supporting only a PS service or a future 4.5G/5G network.

The following describes the scenario in which the UE supporting CS service and PS service camps on the 2G/3G network, or the UE supporting CS service and PS service moves between the 2G/3G network and the LTE network. For other scenarios, refer to descriptions about this scenario and content in the foregoing embodiments.

A NAS of UE maintains list information such as an EPLMN list, a list of forbidden networks, and a list of forbidden networks for a GPRS service in a mobility management procedure. In this step, in addition to the EPLMN list and a list of forbidden location areas that need to be delivered in the prior art, the NAS of the UE delivers the stored list of forbidden networks and the stored list of forbidden networks for the GPRS service to an AS of the UE.

The NAS of the UE determines indication information about a cell selection priority according to an operation mode (Mode of Operation) of the UE. Specifically, the following content may be included:

if the operation mode of the UE is supporting only a CS service (CS mode only), the indication information is determined as: selecting only a cell in which the CS service is available;

if the operation mode of the UE is supporting only a PS service (PS mode only), the indication information is determined as: selecting only a cell in which the PS service is available;

if the operation mode of the UE is supporting a CS service and a PS service (CS/PS mode), the indication information is determined as: selecting a cell in which both the CS service and the PS service are available;

if the operation mode of the UE is supporting a CS service and a PS service with the CS service preferred (CS/PS mode with CS prefer), the indication information is determined as: preferentially selecting a cell in which both the CS service and the PS service are available, and if there is no such cell, selecting a cell in which the CS service is available; or if the operation mode of the UE is supporting a CS service and a PS service with the PS service preferred (CS/PS mode with PS prefer), the indication information is determined as: selecting a cell in which both the CS service and the PS service are available.

The NAS of the UE sends the indication information to the AS of the UE, so that the AS of the UE selects a suitable cell according to the network list information and the indication information. Specifically, the following content may be included:

if the indication information sent by the NAS of the UE to the AS of the UE is: selecting only the cell in which the CS service is available, the AS of the UE selects a first cell according to the network list information and the indication information that are provided, in addition to referring to a 3GPP-defined condition for selecting a suitable cell, where a network to which the first cell belongs is not in the list of forbidden networks;

if the indication information sent by the NAS of the UE to the AS of the UE is: selecting only the cell in which the PS service is available, the AS of the UE selects a second cell according to the network list information and the indication information that are provided, in addition to referring to a 3GPP-defined condition for selecting a suitable cell, where a network to which the second cell belongs is not in the list of forbidden networks and the list of forbidden networks for the GPRS service;

if the indication information sent by the NAS of the UE to the AS of the UE is: selecting the cell in which both the CS service and the PS service are available, the AS of the UE selects a third cell according to the network list information and the indication information that are provided, in addition to referring to a 3GPP-defined condition for selecting a suitable cell, where a network to which the third cell belongs is not in the list of forbidden networks and the list of forbidden networks for the GPRS service; or if the indication information sent by the NAS of the UE to the AS of the UE is: preferentially selecting the cell in which both the CS service and the PS service are available, and if there is no such cell, selecting the cell in which the CS service is available, the AS of the UE selects a fourth cell according to the network list information and the indication information that are provided, in addition to referring to a 3GPP-defined condition for selecting a suitable cell, and if there is no such cell, selects a fifth cell, where a network to which the fourth cell belongs is not in the list of forbidden networks and the list of forbidden networks for the GPRS service, and a network to which the fifth cell belongs is not in the list of forbidden networks.

Figure 9:
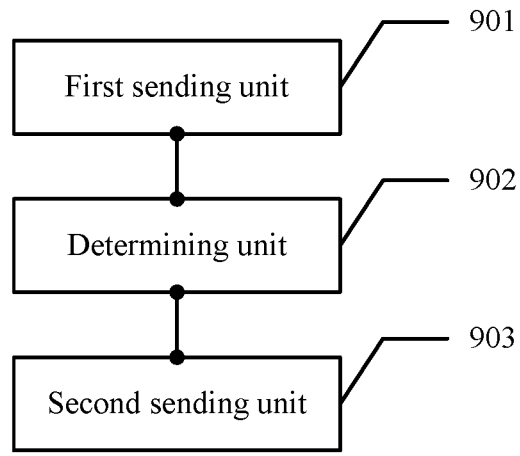
FIG. 9 is a schematic structural diagram of an embodiment of a cell selection apparatus according to the present invention.

The foregoing describes the cell selection method. The following describes a structure of a cell selection apparatus from a perspective of functional units. Referring to FIG. 9, an embodiment of a cell selection apparatus according to the present invention includes:

a first sending unit 901, configured to send network list information to an access stratum of a user equipment UE, where the network list information includes a list of forbidden networks and a list of forbidden networks for a GPRS service;

a determining unit 902, configured to determine indication information about a cell selection priority according to an operation mode of the UE; and a second sending unit 903, configured to send the indication information to the access stratum, so that the access stratum selects a suitable cell according to the network list information and the indication information.

In this embodiment of the present invention, the first sending unit 901 sends the network list information to the access stratum of the user equipment UE, where the network list information includes the list of forbidden networks and the list of forbidden networks for a GPRS service; the determining unit 902 determines the indication information about the cell selection priority according to the operation mode of the UE; and the second sending unit 903 sends the indication information to the access stratum, so that the access stratum selects a suitable cell according to the network list information and the indication information. Therefore, the UE is prevented from entering a state of being able to normally camp but unable to obtain a normal service, and user experience is improved.

Based on the cell selection apparatus in the embodiment shown in FIG. 9, optionally, in another implementation, the determining unit 902 may include at least one of the following subunits:

a first determining subunit, configured to determine, according to the operation mode of the UE, that the indication information is: selecting only a cell in which a circuit switched service is available, where the operation mode of the UE is: supporting only the circuit switched service;

a second determining subunit, configured to determine, according to the operation mode of the UE, that the indication information is: selecting only a cell in which a packet switched service is available, where the operation mode of the UE is: supporting only the packet switched service;

a third determining subunit, configured to determine, according to the operation mode of the UE, that the indication information is: selecting a cell in which both a circuit switched service and a packet switched service are available, where the operation mode of the UE is: supporting the circuit switched service and the packet switched service;

a fourth determining subunit, configured to determine, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth determining subunit, configured to determine, according to the operation mode of the UE, that the indication information is: selecting a cell in which both a circuit switched service and a packet switched service are available, where the operation mode of the UE is: supporting the circuit switched service and the packet switched service with the packet switched service preferred.

Based on the cell selection apparatus in the embodiment shown in FIG. 9, optionally, in another implementation, the network list information further includes a list of forbidden networks for a non-GPRS service, and the determining unit 902 may include at least one of the following subunits:

a first determining subunit, configured to determine, according to the operation mode of the UE, that the indication information is: selecting only a cell in which a circuit switched service is available, where the operation mode of the UE is: supporting only the circuit switched service;

a second determining subunit, configured to determine, according to the operation mode of the UE, that the indication information is: selecting only a cell in which a packet switched service is available, where the operation mode of the UE is: supporting only the packet switched service;

a third determining subunit, configured to determine, according to the operation mode of the UE, that the indication information is: selecting a cell in which both a circuit switched service and a packet switched service are available, where the operation mode of the UE is: supporting the circuit switched service and the packet switched service;

a fourth determining subunit, configured to determine, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth determining subunit, configured to determine, according to the operation mode of the UE, that the indication information is: preferentially selecting a cell in which both a circuit switched service and a packet switched service are available, and if there is no such cell, selecting a cell in which the packet switched service is available, where the operation mode of the UE is: supporting the circuit switched service and the packet switched service with the packet switched service preferred.

Figure 10:
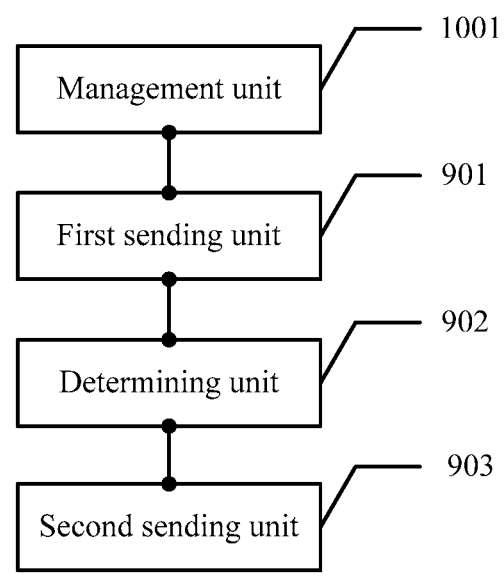
FIG. 10 is a schematic structural diagram of another embodiment of a cell selection apparatus according to the present invention.

Based on the cell selection apparatus in the embodiment shown in FIG. 9, optionally, as shown in FIG. 10, in another embodiment of the cell selection apparatus according to the present invention, the apparatus further includes:

a management unit 1001, configured to add, to the list of forbidden networks for the non-GPRS service, a network in which the non-GPRS service is unavailable, where the network in which the non-GPRS service is unavailable is a network that rejects a non-GPRS service registration request sent by the UE.

Figure 11:
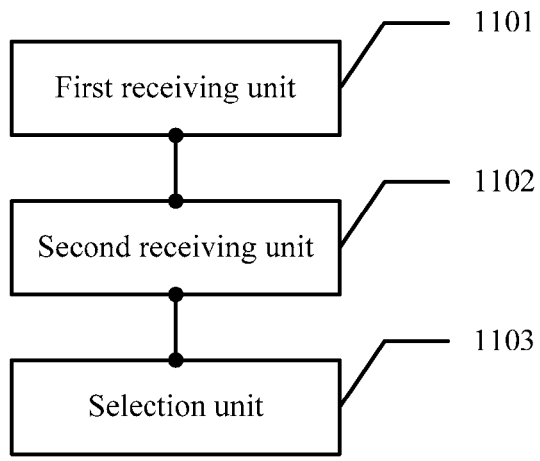
FIG. 11 is a schematic structural diagram of another embodiment of a cell selection apparatus according to the present invention.

Referring to FIG. 11, another embodiment of a cell selection apparatus according to the present invention includes:

a first receiving unit 1101, configured to receive network list information sent by a non-access stratum of a user equipment UE, where the network list information includes a list of forbidden networks and a list of forbidden networks for a GPRS service;

a second receiving unit 1102, configured to receive indication information that is about a cell selection priority and is sent by the non-access stratum, where the indication information is determined by the non-access stratum according to an operation mode of the UE; and a selection unit 1103, configured to select a suitable cell according to the network list information and the indication information.

In this embodiment of the present invention, the first receiving unit 1101 receives the network list information sent by the non-access stratum of the user equipment UE, where the network list information includes the list of forbidden networks and the list of forbidden networks for a GPRS service; the second receiving unit 1102 receives the indication information that is about the cell selection priority and is sent by the non-access stratum, where the indication information is determined by the non-access stratum according to the operation mode of the UE; and the selection unit 1103 selects a suitable cell according to the network list information and the indication information. Therefore, the UE is prevented from entering a state of being able to normally camp but unable to obtain a normal service, and user experience is improved.

Based on the cell selection apparatus in the embodiment shown in FIG. 11, optionally, in another implementation, the selection unit 1103 may include at least one of the following subunits:

a first selection subunit, configured to select a first cell according to the network list information and the indication information, where a network to which the first cell belongs is not in the list of forbidden networks, and the indication information is: selecting only a cell in which a circuit switched service is available;

a second selection subunit, configured to select a second cell according to the network list information and the indication information, where a network to which the second cell belongs is not in the list of forbidden networks and the list of forbidden networks for the GPRS service, and the indication information is: selecting only a cell in which a packet switched service is available;

a third selection subunit, configured to select a third cell according to the network list information and the indication information, where a network to which the third cell belongs is not in the list of forbidden networks and the list of forbidden networks for the GPRS service, and the indication information is: selecting a cell in which both a circuit switched service and a packet switched service are available; or a fourth selection subunit, configured to preferentially select a fourth cell according to the network list information and the indication information, and if there is no such cell, select a fifth cell, where a network to which the fourth cell belongs is not in the list of forbidden networks and the list of forbidden networks for the GPRS service, a network to which the fifth cell belongs is not in the list of forbidden networks, and the indication information is: preferentially selecting a cell in which both a circuit switched service and a packet switched service are available, and if there is no such cell, selecting a cell in which the circuit switched service is available.

Based on the cell selection apparatus in the embodiment shown in FIG. 11, optionally, in another implementation, the network list information further includes a list of forbidden networks for a non-GPRS service, and the selection unit 1103 may include at least one of the following subunits:

a first selection subunit, configured to select a first cell according to the network list information and the indication information, where a network to which the first cell belongs is not in the list of forbidden networks and the list of forbidden networks for the non-GPRS service, and the indication information is: selecting only a cell in which a circuit switched service is available;

a second selection subunit, configured to select a second cell according to the network list information and the indication information, where a network to which the second cell belongs is not in the list of forbidden networks and the list of forbidden networks for the GPRS service, and the indication information is: selecting only a cell in which a packet switched service is available;

a third selection subunit, configured to select a third cell according to the network list information and the indication information, where a network to which the third cell belongs is not in the list of forbidden networks, the list of forbidden networks for the GPRS service, and the list of forbidden networks for the non-GPRS service, and the indication information is: selecting a cell in which both a circuit switched service and a packet switched service are available;

a fourth selection subunit, configured to preferentially select a fourth cell according to the network list information and the indication information, and if there is no such cell, select a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the indication information is: preferentially selecting a cell in which both a circuit switched service and a packet switched service are available, and if there is no such cell, selecting a cell in which the circuit switched service is available; or a fifth selection subunit, configured to preferentially select a sixth cell according to the network list information and the indication information, and if there is no such cell, select a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the indication information is: preferentially selecting a cell in which both a circuit switched service and a packet switched service are available, and if there is no such cell, selecting a cell in which the packet switched service is available.

Figure 12:
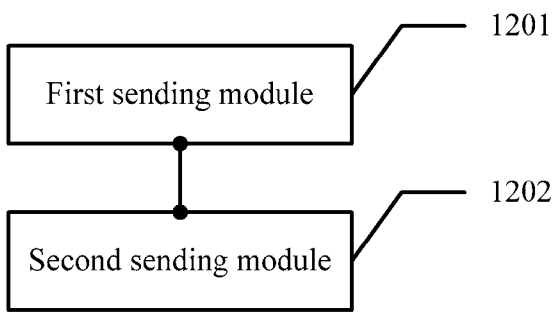
FIG. 12 is a schematic structural diagram of another embodiment of a cell selection apparatus according to the present invention.

Referring to FIG. 12, another embodiment of a cell selection apparatus according to the present invention includes:

a first sending module 1201, configured to send network list information to an access stratum of a user equipment UE, where the network list information includes a list of forbidden networks and a list of forbidden networks for a GPRS service; and a second sending module 1202, configured to send operation mode information of the UE to the access stratum, so that the access stratum selects a suitable cell according to the network list information and the operation mode information.

In this embodiment of the present invention, the first sending module 1201 sends the network list information to the access stratum of the user equipment UE, where the network list information includes the list of forbidden networks and the list of forbidden networks for a GPRS service; and the second sending module 1202 sends the operation mode information of the UE to the access stratum, so that the access stratum selects a suitable cell according to the network list information and the operation mode information. Therefore, the UE is prevented from entering a state of being able to normally camp but unable to obtain a normal service, and user experience is improved.

Based on the cell selection apparatus in the embodiment shown in FIG. 12, optionally, in another implementation, the operation mode information of the UE may include at least one of the following five cases:

a first case: supporting only a circuit switched service;

a second case: supporting only a packet switched service;

a third case: supporting a circuit switched service and a packet switched service;

a fourth case: supporting a circuit switched service and a packet switched service with the circuit switched service preferred; or a fifth case: supporting a circuit switched service and a packet switched service with the packet switched service preferred.

Based on the cell selection apparatus in the embodiment shown in FIG. 12, optionally, in another implementation, the network list information further includes a list of forbidden networks for a non-GPRS service.

Figure 13:
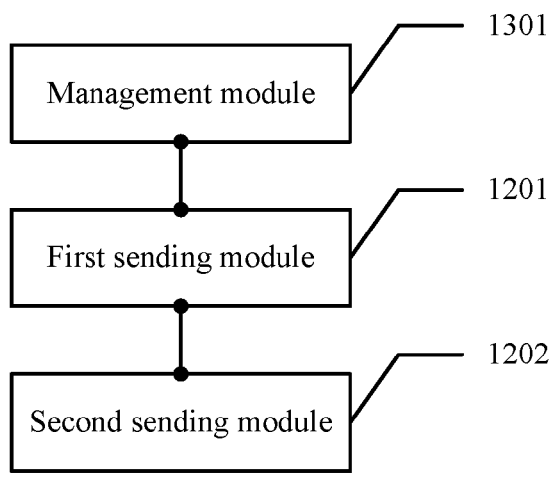
FIG. 13 is a schematic structural diagram of another embodiment of a cell selection apparatus according to the present invention.

Based on the cell selection apparatus in the embodiment shown in FIG. 12, optionally, as shown in FIG. 13, in another embodiment of the cell selection apparatus according to the present invention, the apparatus further includes:

a management module 1301, configured to add, to the list of forbidden networks for the non-GPRS service, a network in which the non-GPRS service is unavailable, where the network in which the non-GPRS service is unavailable is a network that rejects a non-GPRS service registration request sent by the UE.

Figure 14:
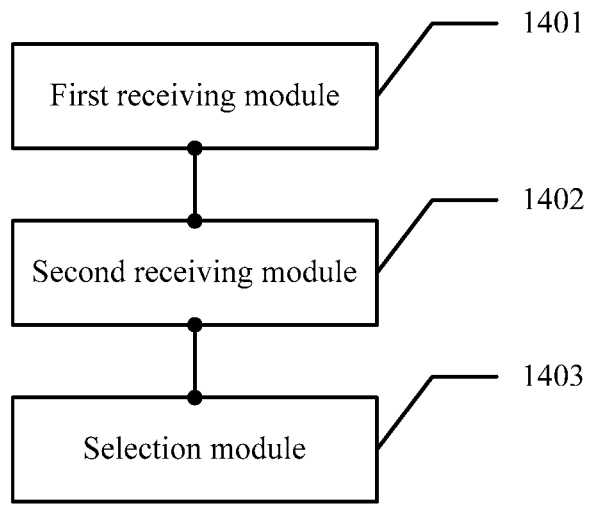
FIG. 14 is a schematic structural diagram of another embodiment of a cell selection apparatus according to the present invention.

Referring to FIG. 14, another embodiment of a cell selection apparatus according to the present invention includes:

a first receiving module 1401, configured to receive network list information sent by a non-access stratum of a user equipment UE, where the network list information includes a list of forbidden networks and a list of forbidden networks for a GPRS service;

a second receiving module 1402, configured to receive operation mode information of the UE that is sent by the non-access stratum; and a selection module 1403, configured to select a suitable cell according to the network list information and the operation mode information.

In this embodiment of the present invention, the first receiving module 1401 receives the network list information sent by the non-access stratum of the user equipment UE, where the network list information includes the list of forbidden networks and the list of forbidden networks for a GPRS service; the second receiving module 1402 receives the operation mode information of the UE that is sent by the non-access stratum; and the selection module 1403 selects a suitable cell according to the network list information and the operation mode information. Therefore, the UE is prevented from entering a state of being able to normally camp but unable to obtain a normal service, and user experience is improved.

Based on the cell selection apparatus in the embodiment shown in FIG. 14, optionally, in another implementation, the selection module 1403 may include at least one of the following submodules:

a first selection submodule, configured to select a first cell according to the network list information and the operation mode information, where a network to which the first cell belongs is not in the list of forbidden networks, and the operation mode information is: supporting only a circuit switched service;

a second selection submodule, configured to select a second cell according to the network list information and the operation mode information, where a network to which the second cell belongs is not in the list of forbidden networks and the list of forbidden networks for the GPRS service, and the operation mode information is: supporting only a packet switched service;

a third selection submodule, configured to select a third cell according to the network list information and the operation mode information, where a network to which the third cell belongs is not in the list of forbidden networks and the list of forbidden networks for the GPRS service, and the operation mode information is: supporting a circuit switched service and a packet switched service;

a fourth selection submodule, configured to preferentially select a fourth cell according to the network list information and the operation mode information, and if there is no such cell, select a fifth cell, where a network to which the fourth cell belongs is not in the list of forbidden networks and the list of forbidden networks for the GPRS service, a network to which the fifth cell belongs is not in the list of forbidden networks, and the operation mode information is: supporting a circuit switched service and a packet switched service with the circuit switched service preferred; or a fifth selection submodule, configured to preferentially select a sixth cell according to the network list information and the operation mode information, where a network to which the sixth cell belongs is not in the list of forbidden networks and the list of forbidden networks for the GPRS service, and the operation mode information is: supporting a circuit switched service and a packet switched service with the packet switched service preferred.

Based on the cell selection apparatus in the embodiment shown in FIG. 14, optionally, in another implementation, the network list information further includes a list of forbidden networks for a non-GPRS service, and the selection module 1403 may include at least one of the following submodules:

a first selection submodule, configured to select a first cell according to the network list information and the operation mode information, where a network to which the first cell belongs is not in the list of forbidden networks and the list of forbidden networks for the non-GPRS service, and the operation mode information is: supporting only a circuit switched service;

a second selection submodule, configured to select a second cell according to the network list information and the operation mode information, where a network to which the second cell belongs is not in the list of forbidden networks and the list of forbidden networks for the GPRS service, and the operation mode information is: supporting only a packet switched service;

a third selection submodule, configured to select a third cell according to the network list information and the operation mode information, where a network to which the third cell belongs is not in the list of forbidden networks, the list of forbidden networks for the GPRS service, and the list of forbidden networks for the non-GPRS service, and the operation mode information is: supporting a circuit switched service and a packet switched service;

a fourth selection submodule, configured to preferentially select a fourth cell according to the network list information and the operation mode information, and if there is no such cell, select a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the operation mode information is: supporting a circuit switched service and a packet switched service with the circuit switched service preferred; or a fifth selection submodule, configured to preferentially select a sixth cell according to the network list information and the operation mode information, and if there is no such cell, select a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the operation mode information is: supporting a circuit switched service and a packet switched service with the packet switched service preferred.

In the embodiments shown in FIG. 9 to FIG. 14, a specific structure of the cell selection apparatus is described from a perspective of functional units. The following describes a specific structure of a cell selection apparatus from a perspective of hardware with reference to embodiments shown in FIG. 15 to FIG. 18.

Figure 15:
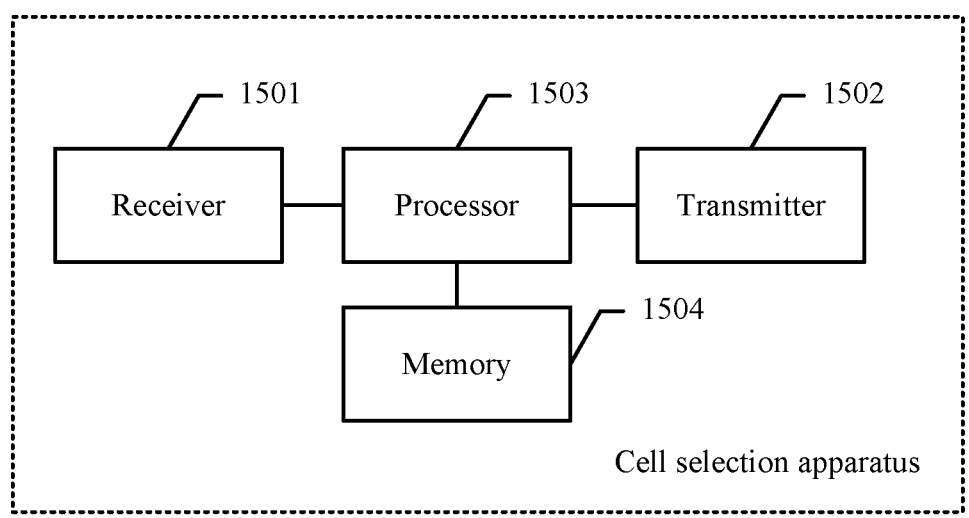
FIG. 15 is a schematic structural diagram of another embodiment of a cell selection apparatus according to the present invention.

In an implementation, as shown in FIG. 15, the cell selection apparatus includes a receiver 1501, a transmitter 1502, a processor 1503, and a memory 1504.

A quantity of components of the cell selection apparatus used in this embodiment of the present invention may be greater than or less than that shown in FIG. 15. Two or more components may be combined, or different components may be configured or disposed. Each component may be implemented in hardware including one or more signal processing and/or dedicated integrated circuits, or in software, or in a combination of hardware and software.

The processor 1503 is configured to read an instruction stored in the memory 1504 to perform the following operations:

sending network list information to an access stratum of a UE, where the network list information includes a list of forbidden networks and a list of forbidden networks for a GPRS service;

determining indication information about a cell selection priority according to an operation mode of the UE; and sending the indication information to the access stratum, so that the access stratum selects a suitable cell according to the network list information and the indication information.

In this embodiment of the present invention, the processor 1503 sends the network list information to the access stratum of the UE, where the network list information includes the list of forbidden networks and the list of forbidden networks for a GPRS service; the processor 1503 determines the indication information about the cell selection priority according to the operation mode of the UE; and processor 1503 sends the indication information to the access stratum, so that the access stratum selects a suitable cell according to the network list information and the indication information. Therefore, the UE is prevented from entering a state of being able to normally camp but unable to obtain a normal service, and user experience is improved.

Optionally, in a scenario in which UE supporting CS service and PS service camps on a 2G/3G network or UE supporting CS service and PS service moves between a 2G/3G network and an LTE network, the processor 1503 is specifically configured to perform at least one of the following operations:

a first operation: determining, according to the operation mode of the UE, that the indication information is: selecting only a cell in which a circuit switched service is available, where the operation mode of the UE is: supporting only the circuit switched service;

a second operation: determining, according to the operation mode of the UE, that the indication information is: selecting only a cell in which a packet switched service is available, where the operation mode of the UE is: supporting only the packet switched service;

a third operation: determining, according to the operation mode of the UE, that the indication information is: selecting a cell in which both a circuit switched service and a packet switched service are available, where the operation mode of the UE is: supporting the circuit switched service and the packet switched service;

a fourth operation: determining, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth operation: determining, according to the operation mode of the UE, that the indication information is: selecting a cell in which both a circuit switched service and a packet switched service are available, where the operation mode of the UE is: supporting the circuit switched service and the packet switched service with the packet switched service preferred.

Optionally, in a scenario in which UE supporting CS service and PS service camps on an LTE network or a future 4.5G/5G network that supports only the PS service, the network list information further includes a list of forbidden networks for a non-GPRS service, and the processor 1503 is specifically configured to perform at least one of the following operations:

a first operation: determining, according to the operation mode of the UE, that the indication information is: selecting only a cell in which a circuit switched service is available, where the operation mode of the UE is: supporting only the circuit switched service;

a second operation: determining, according to the operation mode of the UE, that the indication information is: selecting only a cell in which a packet switched service is available, where the operation mode of the UE is: supporting only the packet switched service;

a third operation: determining, according to the operation mode of the UE, that the indication information is: selecting a cell in which both a circuit switched service and a packet switched service are available, where the operation mode of the UE is: supporting the circuit switched service and the packet switched service;

a fourth operation: determining, according to the operation mode of the UE, that the indication information is: preferentially selecting a cell in which both a circuit switched service and a packet switched service are available, and if there is no such cell, selecting a cell in which the circuit switched service is available, where the operation mode of the UE is: supporting the circuit switched service and the packet switched service with the circuit switched service preferred; or a fifth operation: determining, according to the operation mode of the UE, that the indication information is: preferentially selecting a cell in which both a circuit switched service and a packet switched service are available, and if there is no such cell, selecting a cell in which the packet switched service is available, where the operation mode of the UE is: supporting the circuit switched service and the packet switched service with the packet switched service preferred.

Optionally, the processor 1503 is further configured to perform the following operation:

adding, to the list of forbidden networks for the non-GPRS service, a network in which the non-GPRS service is unavailable, where the network in which the non-GPRS service is unavailable is a network that rejects a non-GPRS service registration request sent by the UE.

Figure 16:
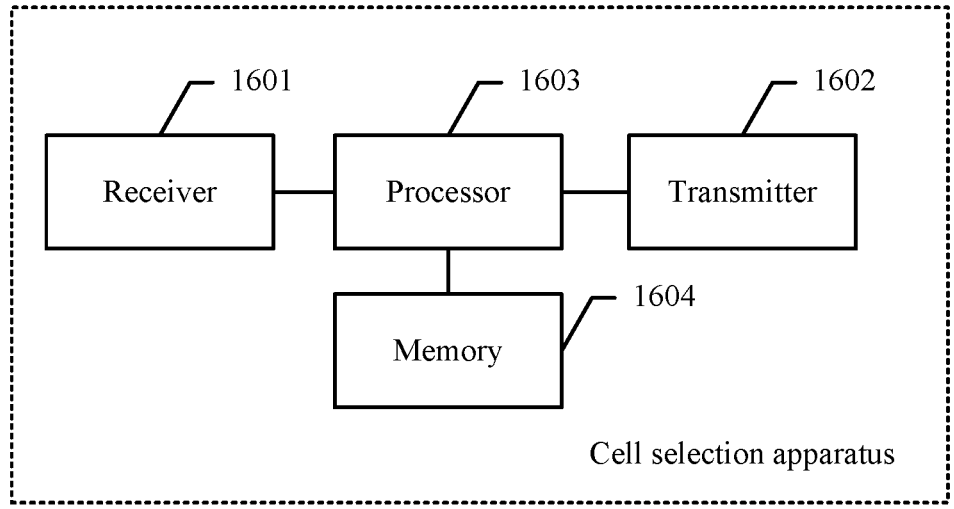
FIG. 16 is a schematic structural diagram of another embodiment of a cell selection apparatus according to the present invention.

In another implementation, as shown in FIG. 16, the cell selection apparatus includes a receiver 1601, a transmitter 1602, a processor 1603, and a memory 1604.

The processor 1603 is configured to read an instruction stored in the memory 1604 to perform the following operations:

receiving network list information sent by a non-access stratum of a UE, where the network list information includes a list of forbidden networks and a list of forbidden networks for a GPRS service;

receiving indication information that is about a cell selection priority and is sent by the non-access stratum, where the indication information is determined by the non-access stratum according to an operation mode of the UE; and selecting a suitable cell according to the network list information and the indication information.

In this embodiment of the present invention, the processor 1603 receives the network list information sent by the non-access stratum of the UE, where the network list information includes the list of forbidden networks and the list of forbidden networks for a GPRS service; the processor 1603 receives the indication information that is about the cell selection priority and is sent by the non-access stratum, where the indication information is determined by the non-access stratum according to the operation mode of the UE; and the processor 1603 selects a suitable cell according to the network list information and the indication information. Therefore, the UE is prevented from entering a state of being able to normally camp but unable to obtain a normal service, and user experience is improved.

Optionally, in a scenario in which UE supporting CS service and PS service camps on a 2G/3G network or UE supporting CS service and PS service moves between a 2G/3G network and an LTE network, the processor 1603 is specifically configured to perform at least one of the following operations:

a first operation: selecting a first cell according to the network list information and the indication information, where a network to which the first cell belongs is not in the list of forbidden networks, and the indication information is: selecting only a cell in which a circuit switched service is available;

a second operation: selecting a second cell according to the network list information and the indication information, where a network to which the second cell belongs is not in the list of forbidden networks and the list of forbidden networks for the GPRS service, and the indication information is: selecting only a cell in which a packet switched service is available;

a third operation: selecting a third cell according to the network list information and the indication information, where a network to which the third cell belongs is not in the list of forbidden networks and the list of forbidden networks for the GPRS service, and the indication information is: selecting a cell in which both a circuit switched service and a packet switched service are available; or a fourth operation: preferentially selecting a fourth cell according to the network list information and the indication information, and if there is no such cell, selecting a fifth cell, where a network to which the fourth cell belongs is not in the list of forbidden networks and the list of forbidden networks for the GPRS service, a network to which the fifth cell belongs is not in the list of forbidden networks, and the indication information is: preferentially selecting a cell in which both a circuit switched service and a packet switched service are available, and if there is no such cell, selecting a cell in which the circuit switched service is available.

Optionally, in a scenario in which UE supporting CS service and PS service camps on an LTE network or a future 4.5G/5G network that supports only the PS service, the network list information further includes a list of forbidden networks for a non-GPRS service, and the processor 1603 is specifically configured to perform at least one of the following operations:

a first operation: selecting a first cell according to the network list information and the indication information, where a network to which the first cell belongs is not in the list of forbidden networks and the list of forbidden networks for the non-GPRS service, and the indication information is: selecting only a cell in which a circuit switched service is available;

a second operation: selecting a second cell according to the network list information and the indication information, where a network to which the second cell belongs is not in the list of forbidden networks and the list of forbidden networks for the GPRS service, and the indication information is: selecting only a cell in which a packet switched service is available;

a third operation: selecting a third cell according to the network list information and the indication information, where a network to which the third cell belongs is not in the list of forbidden networks, the list of forbidden networks for the GPRS service, and the list of forbidden networks for the non-GPRS service, and the indication information is: selecting a cell in which both a circuit switched service and a packet switched service are available;

a fourth operation: preferentially selecting a fourth cell according to the network list information and the indication information, and if there is no such cell, selecting a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the indication information is: preferentially selecting a cell in which both a circuit switched service and a packet switched service are available, and if there is no such cell, selecting a cell in which the circuit switched service is available; or a fifth operation: preferentially selecting a sixth cell according to the network list information and the indication information, and if there is no such cell, selecting a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the indication information is: preferentially selecting a cell in which both a circuit switched service and a packet switched service are available, and if there is no such cell, selecting a cell in which the packet switched service is available.

Figure 17:
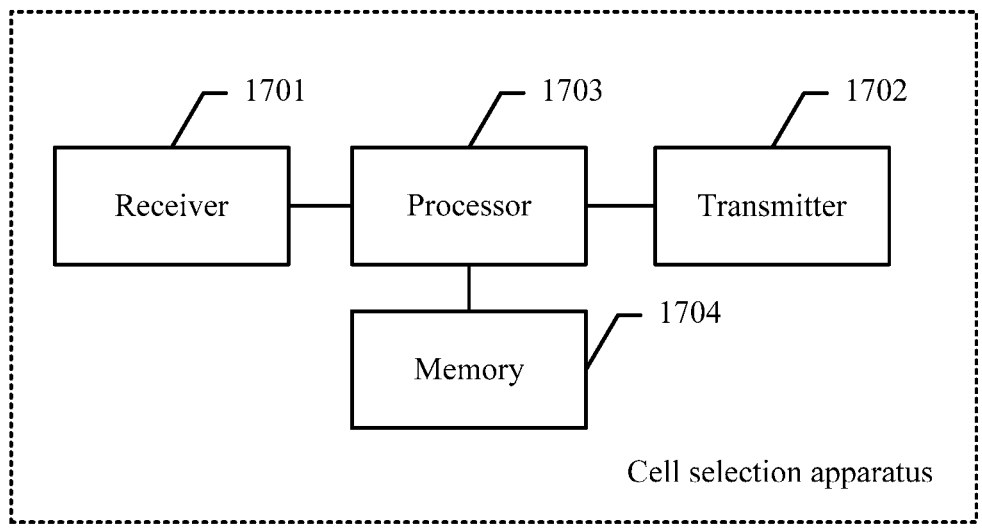
FIG. 17 is a schematic structural diagram of another embodiment of a cell selection apparatus according to the present invention.

In another implementation, as shown in FIG. 17, the cell selection apparatus includes a receiver 1701, a transmitter 1702, a processor 1703, and a memory 1704.

The processor 1703 is configured to read an instruction stored in the memory 1704 to perform the following operations:

sending network list information to an access stratum of the UE, where the network list information includes a list of forbidden networks and a list of forbidden networks for a GPRS service; and sending operation mode information of the UE to the access stratum, so that the access stratum selects a suitable cell according to the network list information and the operation mode information.

In this embodiment of the present invention, the processor 1703 sends the network list information to the access stratum of the UE, where the network list information includes the list of forbidden networks and the list of forbidden networks for a GPRS service; and the processor 1703 sends the operation mode information of the UE to the access stratum, so that the access stratum selects a suitable cell according to the network list information and the operation mode information. Therefore, the UE is prevented from entering a state of being able to normally camp but unable to obtain a normal service, and user experience is improved.

Optionally, in a scenario in which UE supporting CS service and PS service camps on a 2G/3G network or UE supporting CS service and PS service moves between a 2G/3G network and an LTE network, the operation mode information of the UE may include at least one of the following five cases:

a first case: supporting only a circuit switched service;

a second case: supporting only a packet switched service;

a third case: supporting a circuit switched service and a packet switched service;

a fourth case: supporting a circuit switched service and a packet switched service with the circuit switched service preferred; or a fifth case: supporting a circuit switched service and a packet switched service with the packet switched service preferred.

Optionally, in a scenario in which UE supporting CS service and PS service camps on an LTE network or a future 4.5G/5G network that supports only the PS service, the network list information further includes a list of forbidden networks for a non-GPRS service, and the processor 1703 is further configured to perform the following operation:

adding, to the list of forbidden networks for the non-GPRS service, a network in which the non-GPRS service is unavailable, where the network in which the non-GPRS service is unavailable is a network that rejects a non-GPRS service registration request sent by the UE.

Figure 18:
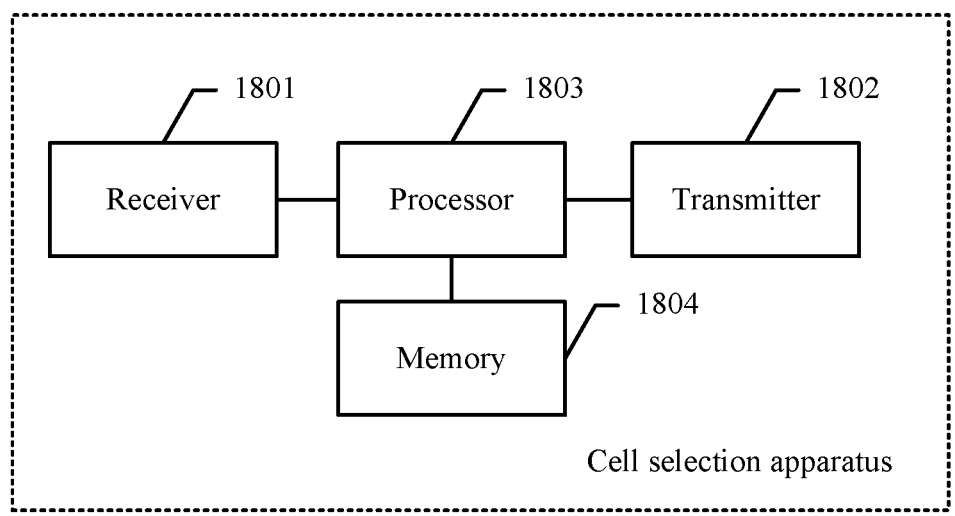
FIG. 18 is a schematic structural diagram of another embodiment of a cell selection apparatus according to the present invention.

In another implementation, as shown in FIG. 18, the cell selection apparatus includes a receiver 1801, a transmitter 1802, a processor 1803, and a memory 1804.

The processor 1803 is configured to read an instruction stored in the memory 1804 to perform the following operations:

receiving network list information sent by a non-access stratum of a UE, where the network list information includes a list of forbidden networks and a list of forbidden networks for a GPRS service;

receiving operation mode information of the UE that is sent by the non-access stratum; and selecting a suitable cell according to the network list information and the operation mode information.

In this embodiment of the present invention, the processor 1803 receives the network list information sent by the non-access stratum of the UE, where the network list information includes the list of forbidden networks and the list of forbidden networks for a GPRS service; the processor 1803 receives the operation mode information of the UE that is sent by the non-access stratum; and the processor 1803 selects a suitable cell according to the network list information and the operation mode information. Therefore, the UE is prevented from entering a state of being able to normally camp but unable to obtain a normal service, and user experience is improved.

Optionally, in a scenario in which UE supporting CS service and PS service camps on a 2G/3G network or UE supporting CS service and PS service moves between a 2G/3G network and an LTE network, the processor 1803 is specifically configured to perform at least one of the following operations:

a first operation: selecting a first cell according to the network list information and the operation mode information, where a network to which the first cell belongs is not in the list of forbidden networks, and the operation mode information is: supporting only a circuit switched service;

a second operation: selecting a second cell according to the network list information and the operation mode information, where a network to which the second cell belongs is not in the list of forbidden networks and the list of forbidden networks for the GPRS service, and the operation mode information is: supporting only a packet switched service;

a third operation: selecting a third cell according to the network list information and the operation mode information, where a network to which the third cell belongs is not in the list of forbidden networks and the list of forbidden networks for the GPRS service, and the operation mode information is: supporting a circuit switched service and a packet switched service;

a fourth operation: preferentially selecting a fourth cell according to the network list information and the operation mode information, and if there is no such cell, selecting a fifth cell, where a network to which the fourth cell belongs is not in the list of forbidden networks and the list of forbidden networks for the GPRS service, a network to which the fifth cell belongs is not in the list of forbidden networks, and the operation mode information is: supporting a circuit switched service and a packet switched service with the circuit switched service preferred; or a fifth operation: selecting a sixth cell according to the network list information and the operation mode information, where a network to which the sixth cell belongs is not in the list of forbidden networks and the list of forbidden networks for the GPRS service, and the operation mode information is: supporting a circuit switched service and a packet switched service with the packet switched service preferred.

Optionally, in a scenario in which UE supporting CS service and PS service camps on an LTE network or a future 4.5G/5G network that supports only the PS service, the network list information further includes a list of forbidden networks for a non-GPRS service, and the processor 1803 is specifically configured to perform at least one of the following operations:

a first operation: selecting a first cell according to the network list information and the operation mode information, where a network to which the first cell belongs is not in the list of forbidden networks and the list of forbidden networks for the non-GPRS service, and the operation mode information is: supporting only a circuit switched service;

a second operation: selecting a second cell according to the network list information and the operation mode information, where a network to which the second cell belongs is not in the list of forbidden networks and the list of forbidden networks for the GPRS service, and the operation mode information is: supporting only a packet switched service;

a third operation: selecting a third cell according to the network list information and the operation mode information, where a network to which the third cell belongs is not in the list of forbidden networks, the list of forbidden networks for the GPRS service, and the list of forbidden networks for the non-GPRS service, and the operation mode information is: supporting a circuit switched service and a packet switched service;

a fourth operation: preferentially selecting a fourth cell according to the network list information and the operation mode information, and if there is no such cell, selecting a fifth cell, where a network to which the fourth cell belongs is not in the list of forbidden networks, the list of forbidden networks for the GPRS service, and the list of forbidden networks for the non-GPRS service, a network to which the fifth cell belongs is not in the list of forbidden networks and the list of forbidden networks for the non-GPRS service, and the operation mode information is: supporting a circuit switched service and a packet switched service with the circuit switched service preferred; or a fifth operation: preferentially selecting a sixth cell according to the network list information and the operation mode information, and if there is no such cell, selecting a seventh cell, where a network to which the sixth cell belongs is not in the list of forbidden networks, the list of forbidden networks for the GPRS service, and the list of forbidden networks for the non-GPRS service, a network to which the seventh cell belongs is not in the list of forbidden networks and the list of forbidden networks for the GPRS service, and the operation mode information is: supporting a circuit switched service and a packet switched service with the packet switched service preferred.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A cell selection method, comprising:
sending, by a non-access stratum of a user equipment (UE), network list information to an access stratum of the UE, wherein the network list information comprises a first list of forbidden public land mobile networks (PLMNs) and a second list of forbidden PLMNs for a General Packet Radio Service (GPRS) service;
determining, by the non-access stratum, indication information about a cell selection priority according to an operation mode of the UE;
sending, by the non-access stratum, the indication information to the access stratum, wherein the network list information and the indication information are used for cell selection;
receiving, by the access stratum of the UE, the network list information from a non-access stratum of the UE;
receiving, by the access stratum, the indication information about the cell selection priority from the non-access stratum; and
selecting, by the access stratum, a suitable cell according to the network list information and the indication information.

2. The method according to claim 1, wherein the determining comprises at least one of the following five cases:
a first case: the non-access stratum determines, according to the operation mode of the UE, that the indication information is: selecting only a cell in which a circuit switched service is available, wherein the operation mode of the UE is: supporting only the circuit switched service;
a second case: the non-access stratum determines, according to the operation mode of the UE, that the indication information is: selecting only a cell in which a packet switched service is available, wherein the operation mode of the UE is: supporting only the packet switched service;
a third case: the non-access stratum determines, according to the operation mode of the UE, that the indication information is: selecting a cell in which both a circuit switched service and a packet switched service are available, wherein the operation mode of the UE is: supporting the circuit switched service and the packet switched service;
a fourth case: the non-access stratum determines, according to the operation mode of the UE, that the indication information is: preferentially selecting a cell in which both a circuit switched service and a packet switched service are available, and if there is no such cell, selecting a cell in which the circuit switched service is available, wherein the operation mode of the UE is: supporting the circuit switched service and the packet switched service with the circuit switched service preferred; or
a fifth case: the non-access stratum determines, according to the operation mode of the UE, that the indication information is: preferentially selecting a cell in which both a circuit switched service and a packet switched service are available, and if there is no such cell, selecting a cell in which the packet switched service is available, wherein the operation mode of the UE is: supporting the circuit switched service and the packet switched service with the packet switched service preferred.

3. The method according to claim 1, wherein the network list information further comprises a third list of forbidden PLMNs for a non-GPRS service.

4. The method according to claim 3, wherein before sending the network list information, the method comprises:
adding, by the non-access stratum of the user equipment UE, to the third list, a PLMN that rejects a non-GPRS service registration request sent by the UE.

5. The method according to claim 1, wherein the selecting comprises at least one of the following five cases:
a first case: the access stratum selects a first cell according to the network list information and the indication information, wherein a PLMN to which the first cell belongs is not in the first list, and the indication information is: selecting only a cell in which a circuit switched service is available;
a second case: the access stratum selects a second cell according to the network list information and the indication information, wherein a PLMN to which the second cell belongs is not in the first list and not in the second list, and the indication information is: selecting only a cell in which a packet switched service is available;
a third case: the access stratum selects a third cell according to the network list information and the indication information, wherein a PLMN to which the third cell belongs is not in the first list and not in the second list, and the indication information is: selecting a cell in which both a circuit switched service and a packet switched service are available;
a fourth case: the access stratum preferentially selects a fourth cell according to the network list information and the indication information, and if there is no such cell, selects a fifth cell, wherein a PLMN to which the fourth cell belongs is not in the first list and not in the second list, a PLMN to which the fifth cell belongs is not in the first list, and the indication information is: preferentially selecting a cell in which both a circuit switched service and a packet switched service are available, and if there is no such cell, selecting a cell in which the circuit switched service is available; or
a fifth case: the access stratum preferentially selects a sixth cell according to the network list information and the indication information, and if there is no such cell, selects a seventh cell, wherein a PLMN to which the sixth cell belongs is not in the first list and not in the second list, a PLMN to which the seventh cell belongs is not in the first list and not in the second list, and the indication information is: preferentially selecting a cell in which both a circuit switched service and a packet switched service are available, and if there is no such cell, selecting a cell in which the packet switched service is available.

6. The method according to claim 1, wherein the network list information further comprises a third list of forbidden PLMNs for a non-GPRS service, and the selecting comprises at least one of the following five cases:
a first case: the access stratum selects a first cell according to the network list information and the indication information, wherein a PLMN to which the first cell belongs is not in the first list and not in the third list, and the indication information is: selecting only a cell in which a circuit switched service is available;
a second case: the access stratum selects a second cell according to the network list information and the indication information, wherein a PLMN to which the second cell belongs is not in the first list and not in the second list, and the indication information is: selecting only a cell in which a packet switched service is available;

a third case: the access stratum selects a third cell according to the network list information and the indication information, wherein a PLMN to which the third cell belongs is not in the first list, the second list, and the third list, and the indication information is: selecting a cell in which both a circuit switched service and a packet switched service are available;

a fourth case: the access stratum preferentially selects a fourth cell according to the network list information and the indication information, and if there is no such cell, selects a fifth cell, wherein a PLMN to which the fourth cell belongs is not in the first list, the second list, and the third list, a PLMN to which the fifth cell belongs is not in the first list and not in the third list, and the indication information is: preferentially selecting a cell in which both a circuit switched service and a packet switched service are available, and if there is no such cell, selecting a cell in which the circuit switched service is available; or a fifth case: the access stratum preferentially selects a sixth cell according to the network list information and the indication information, and if there is no such cell, selects a seventh cell, wherein a PLMN to which the sixth cell belongs is not in the first list, the second list, and the third list, a PLMN to which the seventh cell belongs is not in the first list and not in the second list, and the indication information is: preferentially selecting a cell in which both a circuit switched service and a packet switched service are available, and if there is no such cell, selecting a cell in which the packet switched service is available.

7. An non-transitory computer readable medium, comprising:

a computer program code comprising one or more executable instructions, which, when executed by a user equipment, cause a non-access stratum of the user equipment to determine indication information about a cell selection priority according to an operation mode of the UE, and to send the indication information and network list information, wherein the network list information comprises a first list of forbidden public land mobile networks (PLMNs) and a second list of forbidden PLMNs for a General Packet Radio Service (GPRS) service; and the one or more executable instructions further cause an access stratum of the UE to receive the indication information and the network list information from the non-access stratum, and to select a suitable cell according to the network list information and the indication information.

8. The non-transitory computer readable medium according to claim 7, wherein the one or more executable instructions cause the non-access stratum to determine, according to the operation mode of the UE, that the indication information is: selecting only a cell in which a circuit switched service is available, wherein the operation mode of the UE is: supporting only the circuit switched service;

the one or more executable instructions cause the access stratum to select a first cell according to the network list information and the indication information, wherein a PLMN to which the first cell belongs is not in the first list.

9. The non-transitory computer readable medium according to claim 7, wherein the one or more executable instructions cause the non-access stratum to determine, according to the operation mode of the UE, that the indication information is: selecting only a cell in which a packet switched service is available, wherein the operation mode of the UE is: supporting only the packet switched service;

the one or more executable instructions cause the access stratum to select a second cell according to the network list information and the indication information, wherein a PLMN to which the second cell belongs is not in the first list and not in the second list.

10. The non-transitory computer readable medium according to claim 7, wherein the one or more executable instructions cause the non-access stratum to determine, according to the operation mode of the UE, that the indication information is: selecting a cell in which both a circuit switched service and a packet switched service are available, wherein the operation mode of the UE is: supporting the circuit switched service and the packet switched service;

the one or more executable instructions cause the access stratum to select a third cell according to the network list information and the indication information, wherein a PLMN to which the third cell belongs is not in the first list and not in the second list.

11. The non-transitory computer readable medium according to claim 7, wherein the one or more executable instructions cause the non-access stratum to determine, according to the operation mode of the UE, that the indication information is: preferentially selecting a cell in which both a circuit switched service and a packet switched service are available, and if there is no such cell, selecting a cell in which the circuit switched service is available, wherein the operation mode of the UE is: supporting the circuit switched service and the packet switched service with the circuit switched service preferred;

the one or more executable instructions cause the access stratum to preferentially select a fourth cell according to the network list information and the indication information, and if there is no such cell, select a fifth cell, wherein a PLMN to which the fourth cell belongs is not in the first list and not in the second list, a PLMN to which the fifth cell belongs is not in the first list.

12. The non-transitory computer readable medium according to claim 7, wherein the one or more executable instructions cause the non-access stratum to determine, according to the operation mode of the UE, that the indication information is: preferentially selecting a cell in which both a circuit switched service and a packet switched service are available, and if there is no such cell, selecting a cell in which the packet switched service is available, wherein the operation mode of the UE is: supporting the circuit switched service and the packet switched service with the packet switched service preferred;

the one or more executable instructions cause the access stratum to preferentially select a sixth cell according to the network list information and the indication information, and if there is no such cell, select a seventh cell, wherein a PLMN to which the sixth cell belongs is not in the first list and not in the second list, a PLMN to which the seventh cell belongs is not in the first list and not in the second list.

13. The non-transitory computer readable medium according to claim 7, wherein the network list information further comprises a third list of forbidden PLMNs for a non-GPRS service.

14. The non-transitory computer readable medium according to claim 13, wherein
the one or more executable instructions cause the non-access stratum to determine, according to the operation mode of the UE, that the indication information is: selecting only a cell in which a circuit switched service is available, wherein the operation mode of the UE is: supporting only the circuit switched service;
the one or more executable instructions cause the access stratum to select a first cell according to the network list information and the indication information, wherein a PLMN to which the first cell belongs is not in the first list and not in the third list.

15. The non-transitory computer readable medium according to claim 13, wherein
the one or more executable instructions cause the non-access stratum to determine, according to the operation mode of the UE, that the indication information is: selecting a cell in which both a circuit switched service and a packet switched service are available, wherein the operation mode of the UE is: supporting the circuit switched service and the packet switched service;
the one or more executable instructions cause the access stratum to select a third cell according to the network list information and the indication information, wherein a PLMN to which the third cell belongs is not in the first list, not in the second list, and not in the third list.

16. The non-transitory computer readable medium according to claim 13, wherein
the one or more executable instructions cause the non-access stratum to determine, according to the operation mode of the UE, that the indication information is: preferentially selecting a cell in which both a circuit switched service and a packet switched service are available, and if there is no such cell, selecting a cell in which the circuit switched service is available, wherein the operation mode of the UE is: supporting the circuit switched service and the packet switched service with the circuit switched service preferred;
the one or more executable instructions cause the access stratum to preferentially select a fourth cell according to the network list information and the indication information, and if there is no such cell, select a fifth cell, wherein a PLMN to which the fourth cell belongs is not in the first list, not in the second list, and not in the third list, a PLMN to which the fifth cell belongs is not in the first list and not in the third list.

17. The non-transitory computer readable medium according to claim 13, wherein
the one or more executable instructions cause the non-access stratum to determine, according to the operation mode of the UE, that the indication information is: preferentially selecting a cell in which both a circuit switched service and a packet switched service are available, and if there is no such cell, selecting a cell in which the packet switched service is available, wherein the operation mode of the UE is: supporting the circuit switched service and the packet switched service with the packet switched service preferred;
wherein the one or more executable instructions cause the access stratum to preferentially select a sixth cell according to the network list information and the indication information, and if there is no such cell, select a seventh cell, wherein a PLMN to which the sixth cell belongs is not in the first list, not in the second list, and not in the third list, a PLMN to which the seventh cell belongs is not in the first list and not in the second list.

18. The non-transitory computer readable medium according to claim 7, wherein the one or more executable instructions further cause the non-access stratum to add to the third list, a PLMN that rejects a non-GPRS service registration request sent by the UE.

* * * * *